US008077558B1

United States Patent
Tsutsumi et al.

(10) Patent No.: US 8,077,558 B1
(45) Date of Patent: Dec. 13, 2011

(54) THERMALLY-ASSISTED MAGNETIC RECORDING HEAD INCLUDING PLASMON GENERATOR

(75) Inventors: Takeshi Tsutsumi, Tokyo (JP); Daisuke Miyauchi, Tokyo (JP); Tetsuya Roppongi, Tokyo (JP); Kosuke Tanaka, Tokyo (JP); Susumu Aoki, Tokyo (JP); Takahiko Izawa, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 73 days.

(21) Appl. No.: 12/785,897

(22) Filed: May 24, 2010

(51) Int. Cl.
*G11B 11/00* (2006.01)
(52) U.S. Cl. .................. 369/13.33; 369/112.27
(58) Field of Classification Search .......... 369/13.24, 369/13.33, 13.13, 13.32, 13.12, 13.03, 13.02, 369/112.27, 112.09, 112.14, 112.21; 360/59, 360/245.3; 385/31, 129
See application file for complete search history.

(56) References Cited

U.S. PATENT DOCUMENTS

| 6,649,894 | B2 * | 11/2003 | Matsumoto et al. ........ 250/201.3 |
| 6,768,556 | B1 * | 7/2004 | Matsumoto et al. ........... 356/601 |
| 7,221,826 | B2 | 5/2007 | Hanashima et al. |
| 7,330,404 | B2 * | 2/2008 | Peng et al. ................. 369/13.33 |
| 7,454,095 | B2 | 11/2008 | Baehr-Jones et al. |
| 7,821,732 | B2 * | 10/2010 | Komura et al. ................. 360/59 |
| 7,911,882 | B2 * | 3/2011 | Shimazawa et al. ........ 369/13.33 |
| 8,000,178 | B2 * | 8/2011 | Shimazawa et al. ........ 369/13.33 |
| 2007/0139818 | A1 | 6/2007 | Shimazawa et al. |
| 2009/0168220 | A1 | 7/2009 | Komura et al. |
| 2011/0205860 | A1 * | 8/2011 | Chou et al. .................. 369/13.24 |
| 2011/0228420 | A1 * | 9/2011 | Hara et al. ...................... 360/59 |

FOREIGN PATENT DOCUMENTS

JP   A-2004-302241   10/2004

OTHER PUBLICATIONS

U.S. Appl. No. 12/710,129, filed in the name of Chou et al., on Feb. 22, 2010.
U.S. Appl. No. 12/453,508, filed in the name of Isogai et al., on May 13, 2009.
U.S. Appl. No. 12/557,078, filed in the name of Miyauchi et al., on Sep. 10, 2009.
U.S. Appl. No. 12/457,984, filed in the name of Sasaki et al., on Jun. 26, 2009.

* cited by examiner

*Primary Examiner* — Ali Neyzari
(74) *Attorney, Agent, or Firm* — Oliff & Berridge, PLC

(57) ABSTRACT

A plasmon generator has an outer surface including a plasmon exciting part that faces an evanescent light generating surface of a waveguide. The outer surface further includes first and second inclined surfaces that increase in distance from each other with increasing distance from the plasmon exciting part, and a front end face. The front end face has first and second portions that are connected to each other into a V-shape. The first portion includes a first side lying at an end of the first inclined surface. The second portion includes a second side lying at an end of the second inclined surface. An angle formed between a lower part of the first side and a lower part of the second side is smaller than that formed between an upper part of the first side and an upper part of the second side.

14 Claims, 19 Drawing Sheets

THERMALLY-ASSISTED MAGNETIC RECORDING HEAD INCLUDING PLASMON GENERATOR

BACKGROUND OF THE INVENTION

1. Field of the Invention

The present invention relates to a thermally-assisted magnetic recording head including a plasmon generator for use in thermally-assisted magnetic recording where a magnetic recording medium is irradiated with near-field light to lower the coercivity of the magnetic recording medium for data writing.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the foregoing problems, there has been proposed a technique so-called thermally-assisted magnetic recording. This technique uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, the plasmon antenna which generates near-field light by direct irradiation with light is known to exhibit very low efficiency of transformation of the applied light into near-field light. The energy of the light applied to the plasmon antenna is mostly reflected off the surface of the plasmon antenna, or transformed into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the thermally-assisted magnetic recording head to face the magnetic recording medium. This causes an end of the read head located in the medium facing surface to get farther from the magnetic recording medium, thereby causing the problem that a servo signal cannot be read during write operations.

There has been known a technique in which a dielectric and a metal are arranged to face each other with a predetermined gap therebetween, and surface plasmons are excited on the metal by utilizing evanescent light that results from the total reflection of the light propagated through the dielectric at the surface of the dielectric. As a related technique, U.S. Pat. No. 7,454,095 discloses a technique in which a metal waveguide and a dielectric waveguide are arranged to face each other with a predetermined gap therebetween, and the metal waveguide is coupled with the dielectric waveguide in a surface plasmon mode. It is then conceivable to establish coupling between the light propagated through the waveguide's core and a plasmon generator, a piece of metal, in a surface plasmon mode through a buffer part so that surface plasmons are excited on the plasmon generator, instead of directly irradiating the plasmon generator with the light. According to such a technique, it is possible to transform the light propagated through the core into near-field light with high efficiency. Since the plasmon generator is not directly irradiated with the light propagated through the core, it is also possible to prevent the plasmon generator from excessively increasing in temperature.

The plasmon generator may be shaped to have an edge part that faces the outer surface of the core with a predetermined distance therebetween. An example of such a shape is a triangular-prism shape. Such a plasmon generator has a front end face that is located in the medium facing surface. The front end face includes a tip that lies at an end of the edge part to form a near-field light generating part. The plasmon generator includes two inclined surfaces that are each connected to the edge part, the two inclined surfaces increasing in distance from each other with increasing distance from the edge part. In the plasmon generator, surface plasmons are excited on the edge part through coupling with the evanescent light that occurs from the outer surface of the core. The surface plasmons are propagated along the edge part to the near-field light generating part located in the medium facing surface, and the near-field light generating part generates near-field light based on the surface plasmons. With such a plasmon generator, it is possible to propagate the surface plasmons excited on the edge part to the near-field light generating part with high efficiency.

In the foregoing plasmon generator, the edge part is ideally formed into a linear shape by the contact of the two inclined surfaces with each other with a predetermined angle formed therebetween. In an actually fabricated plasmon generator, however, the edge part is rounded and thereby has a cylindrical surface configuration that connects the two inclined surfaces forming a predetermined angle therebetween. As employed herein, the radius of curvature of the edge part having the cylindrical surface configuration will be referred to as point radius. The angle that each of the two inclined surfaces forms with respect to the direction perpendicular to the surface of the core that the edge part faces will be referred to as inclination angle. As will be described below, the point radius and the inclination angle of the plasmon generator used in a thermally-assisted magnetic recording head are significant parameters that affect the characteristics of the thermally-assisted magnetic recording head.

First, the point radius will be described. The point radius is a parameter that affects the spot diameter of the near-field light occurring from the near-field light generating part. In order to increase the recording density of a magnetic recording device, a smaller spot diameter is preferred for the near-field light. To reduce the spot diameter of the near-field light, a smaller point radius is preferred.

Next, the inclination angle will be described. To increase the use efficiency of the light propagated through the core of the waveguide, it is important to increase the intensity of the surface plasmons excited on the plasmon generator. This requires that the wave number of the evanescent light and the wave number of the surface plasmons excited on the plasmon generator be matched with each other. The wave number of the surface plasmons excited on the plasmon generator varies according to the shape of the plasmon generator. The inclination angle is thus a parameter that affects the wave number of the surface plasmons excited on the plasmon generator. Meanwhile, the wave number of the evanescent light depends on the wavelength of the light propagated through the core. When typical laser light is used as the light to be propagated through the core, it is necessary that the wave number of the surface plasmons to be excited on the plasmon generator be matched with the wave number of the evanescent light which depends on the wavelength of the laser light. This means that there is a preferred range for the inclination angle.

As seen above, for a plasmon generator having an edge part that faces the core with a buffer part therebetween, the inclination angle needs to fall within the preferred range in order to increase the use efficiency of the light propagated through the core, and the point radius needs to be made smaller in order to make the spot diameter of the near-field light smaller. In order to make the point radius smaller, it is effective to make the inclination angle smaller so that the front end face of the plasmon generator has a tip of more sharply pointed shape. Making the inclination angle smaller, however, gives rise to the problem that the wave number of the surface plasmons to be excited on the plasmon generator does not match with the wave number of the evanescent light. This decreases the surface plasmons to be excited on the edge part, thereby decreasing the use efficiency of the light propagated through the core.

When a thermally-assisted magnetic recording head employs such a configuration that the light propagated through the core is coupled with the plasmon generator in a surface plasmon mode through a buffer part, there arises the following problem if the position of occurrence of the write magnetic field and the position of occurrence of the near-field light are located close to each other. That is, in such a case, both the core and the magnetic pole need to be located near the plasmon generator. It follows that the magnetic pole is located near the core. The magnetic pole is typically made of a magnetic metal material. The presence of such a magnetic pole near the core causes the problem that part of the light propagated through the core is absorbed by the magnetic pole and the use efficiency of the light propagated through the core thereby decreases.

OBJECT AND SUMMARY OF THE INVENTION

It is an object of the present invention to provide a thermally-assisted magnetic recording head that allows efficient use of the light propagated through the core of the waveguide, allows generation of near-field light having a small spot diameter from the plasmon generator, and allows the position of occurrence of the write magnetic field and the position of the occurrence of the near-field light to be close to each other, and to provide a method of manufacturing the thermally-assisted magnetic recording head, and a head gimbal assembly and a magnetic recording device that each include the thermally-assisted magnetic recording head.

A thermally-assisted magnetic recording head of the present invention includes: a medium facing surface that faces a magnetic recording medium; a magnetic pole that has an end face located in the medium facing surface and produces a write magnetic field for writing data on the magnetic recording medium; a waveguide including a core and a clad, the core propagating light; and a plasmon generator.

The core has an evanescent light generating surface that generates evanescent light based on the light propagated through the core. The plasmon generator has an outer surface including a plasmon exciting part, and has a near-field light generating part lying at an end of the plasmon exciting part and located in the medium facing surface. The plasmon exciting part faces the evanescent light generating surface with a predetermined distance therebetween. The plasmon generator is located above the evanescent light generating surface. A surface plasmon is excited on the plasmon exciting part through coupling with the evanescent light generated from the evanescent light generating surface. The near-field light generating part generates near-field light based on the surface plasmon excited on the plasmon exciting part.

The outer surface of the plasmon generator further includes first and second inclined surfaces that are each connected to the plasmon exciting part, and a front end face that is located in the medium facing surface and connected to the first and second inclined surfaces. The first and second inclined surfaces increase in distance from each other with increasing distance from the plasmon exciting part. The front end face has first and second portions that are connected to each other into a V-shape. The end face of the magnetic pole has a portion interposed between the first and second portions of the front end face. The first portion includes a first side that lies at an end of the first inclined surface. The second portion includes a second side that lies at an end of the second inclined surface. Each of the first side and the second side includes an upper part and a lower part that are continuous with each other. An angle formed between the lower part of the first side and the lower part of the second side is smaller than that formed between the upper part of the first side and the upper part of the second side.

In the thermally-assisted magnetic recording head of the present invention, the front end face may have a bottom end that is closer to the evanescent light generating surface. The distance between the bottom end and a virtual straight line that passes through the border between the upper and lower parts of the first side and the border between the upper and lower parts of the second side may fall within the range of 10 to 25 nm.

In the thermally-assisted magnetic recording head of the present invention, the plasmon exciting part may include a propagative edge that connects respective ends of the first and second inclined surfaces to each other, the respective ends being closer to the evanescent light generating surface. The near-field light generating part may lie at an end of the propagative edge. In such a case, the plasmon generator may have a V-shaped portion that includes the propagative edge and the front end face. The V-shaped portion is V-shaped in cross section parallel to the medium facing surface. The magnetic pole may include a portion accommodated in the V-shaped portion.

In the thermally-assisted magnetic recording head of the present invention, the plasmon exciting part may include a flat surface part that connects respective ends of the first and second inclined surfaces to each other, the respective ends being closer to the evanescent light generating surface. In such a case, the flat surface part may include a width changing portion. The width changing portion has a width that decreases with decreasing distance to the medium facing surface, the width being in a direction parallel to the medium facing surface and the evanescent light generating surface. The width changing portion may have a front end part that is closer to the medium facing surface. The front end part may be located at a distance from the medium facing surface. The plasmon exciting part may further have a propagative edge that connects the front end part of the width changing portion to the near-field light generating part.

In the thermally-assisted magnetic recording head of the present invention, when the plasmon exciting part includes the flat surface part and the flat surface part includes the width changing portion, the plasmon generator may have a bottom part that is shaped like a plate and two sidewall parts that are each shaped like a plate. The bottom part includes the width changing portion. The two sidewall parts are located farther from the evanescent light generating surface than is the bottom part and are connected to opposite ends of the bottom part in the direction parallel to the medium facing surface and the evanescent light generating surface. The bottom part has a width that decreases with decreasing distance to the medium facing surface, the width being in the direction parallel to the medium facing surface and the evanescent light generating surface. The distance between the two sidewall parts in the direction parallel to the medium facing surface and the evanescent light generating surface increases with increasing distance from the evanescent light generating surface, and decreases with decreasing distance to the medium facing surface. The first and second inclined surfaces include respective surfaces of the two sidewall parts, the respective surfaces lying on opposite sides in the direction parallel to the medium facing surface and the evanescent light generating surface. The magnetic pole may include a portion that is accommodated in a space formed by the bottom part and the two sidewall parts so as to be in contact with the bottom part and the two sidewall parts.

The thermally-assisted magnetic recording head of the present invention may further include a buffer part that is located between the evanescent light generating surface and the plasmon exciting part and has a refractive index lower than that of the core.

A head gimbal assembly of the present invention includes: the thermally-assisted magnetic recording head of the present invention; and a suspension that supports the thermally-assisted magnetic recording head. A magnetic recording device of the present invention includes: a magnetic recording medium; the thermally-assisted magnetic recording head of the present invention; and a positioning device that supports the thermally-assisted magnetic recording head and positions the same with respect to the magnetic recording medium.

A method of manufacturing the thermally-assisted magnetic recording head of the present invention includes the steps of forming the waveguide; forming the plasmon generator after the formation of the waveguide; and forming the magnetic pole after the formation of the plasmon generator.

The step of forming the waveguide includes the steps of: forming the core; and forming a clad layer that constitutes at least part of the clad. The clad layer has a top surface that is located above the core, and a groove that opens in the top surface of the clad layer and is located above the core. The groove has first and second sidewalls that decrease in distance from each other with increasing distance from the top surface of the clad layer.

The method of manufacturing the thermally-assisted magnetic recording head of the present invention further includes the step of forming a dielectric film in the groove, between the step of forming the waveguide and the step of forming the plasmon generator, the dielectric film being intended for determining a shape of the plasmon generator. The groove and the dielectric film constitute an accommodating part for accommodating the plasmon generator. The plasmon generator is formed to be accommodated in the accommodating part.

In the method of manufacturing the thermally-assisted magnetic recording head of the present invention, the dielectric film may include a first film portion that adheres to the first sidewall, and a second film portion that adheres to the second sidewall. Each of the first film portion and the second film portion may include an upper part and a lower part that are continuous with each other. In the first film portion, the lower part has a thickness smaller than that of the upper part in a direction perpendicular to the first sidewall. In the second film portion, the lower part has a thickness smaller than that of the upper part in a direction perpendicular to the second sidewall. In such a case, the dielectric film may be formed by sputtering. Alternatively, the dielectric film may be formed by ion beam sputtering. If the dielectric film is formed by ion beam sputtering, the traveling direction of a center of a material particle flow for forming the first film portion may form a greater angle with respect to a direction perpendicular to the top surface of the clad layer than an angle that the second sidewall forms with respect to the direction perpendicular to the top surface of the clad layer, when forming the first film portion. When forming the second film portion, the traveling direction of a center of a material particle flow for forming the second film portion may form a greater angle with respect to the direction perpendicular to the top surface of the clad layer than an angle that the first sidewall forms with respect to the direction perpendicular to the top surface of the clad layer.

According to the present invention, a surface plasmon is excited on the plasmon exciting part of the plasmon generator through coupling with the evanescent light generated from the evanescent light generating surface of the core of the waveguide. The near-field light generating part generates near-field light based on the surface plasmon. According to the present invention, it is thereby possible to transform the light propagated through the core into near-field light with high efficiency.

In the present invention, the outer surface of the plasmon generator includes the first and second inclined surfaces and the front end face. The front end face has the first and second portions connected to each other into a V-shape. The first portion includes the first side lying at the end of the first inclined surface. The second portion includes the second side lying at the end of the second inclined surface. Each of the first side and the second side includes the upper and lower parts continuous with each other. The angle formed between the lower part of the first side and the lower part of the second side is smaller than that formed between the upper part of the first side and the upper part of the second side. Consequently, according to the present invention, it is possible to match the wave number of the surface plasmons to be excited on the plasmon generator with the wave number of the evanescent light, and to reduce the spot diameter of the near-field light by making the angle between the lower part of the first side and the lower part of the second side smaller. The present invention thus makes it possible to use the light propagated through the core of the waveguide with high efficiency and to produce near-field light with a small spot diameter from the plasmon generator.

In the present invention, the end face of the magnetic pole located in the medium facing surface has the portion interposed between the first and second portions of the front end face. Consequently, according to the present invention, it is possible to locate the position of occurrence of the write magnetic field and the position of occurrence of the near-field light close to each other.

Other and further objects, features and advantages of the present invention will appear more fully from the following description.

DETAILED DESCRIPTION OF THE PREFERRED EMBODIMENTS

First Embodiment

Figure 8:
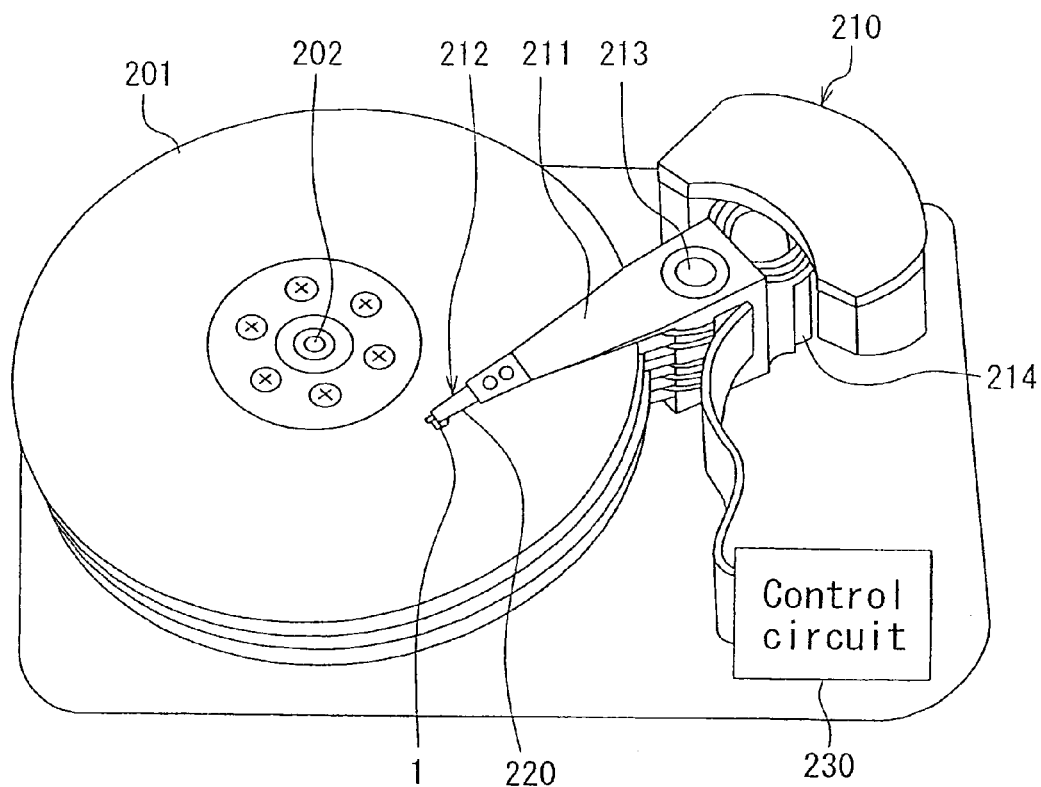
FIG. 8 is a perspective view showing a magnetic recording device according to the first embodiment of the invention.

Preferred embodiments of the present invention will now be described in detail with reference to the drawings. First, reference is made to FIG. 8 to describe a magnetic disk drive that functions as a magnetic recording device according to a first embodiment of the invention. As shown in FIG. 8, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the present embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 9:
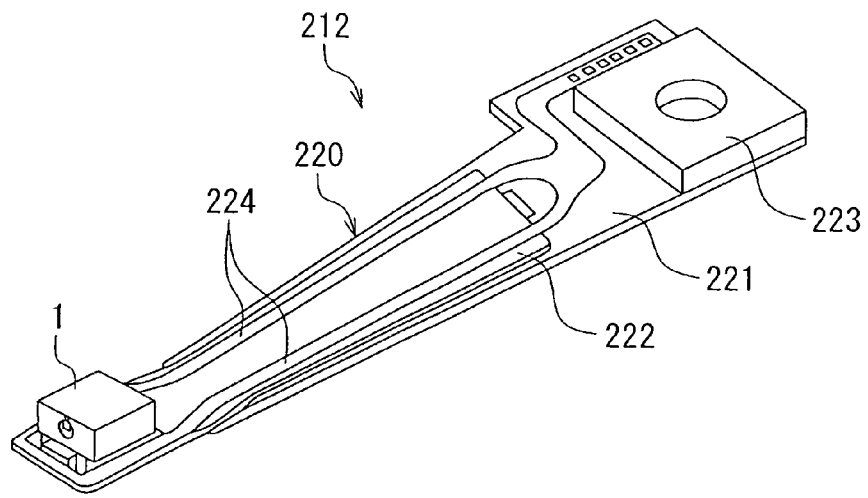
FIG. 9 is a perspective view showing a head gimbal assembly according to the first embodiment of the invention.

FIG. 9 is a perspective view showing the head gimbal assembly 212 of FIG. 8. As previously described, the head gimbal assembly 212 includes the thermally-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to the one having the configuration shown in FIG. 9. For example, the head gimbal assembly of the present invention may have an IC chip for driving the head that is mounted somewhere along the suspension 220.

Figure 10:
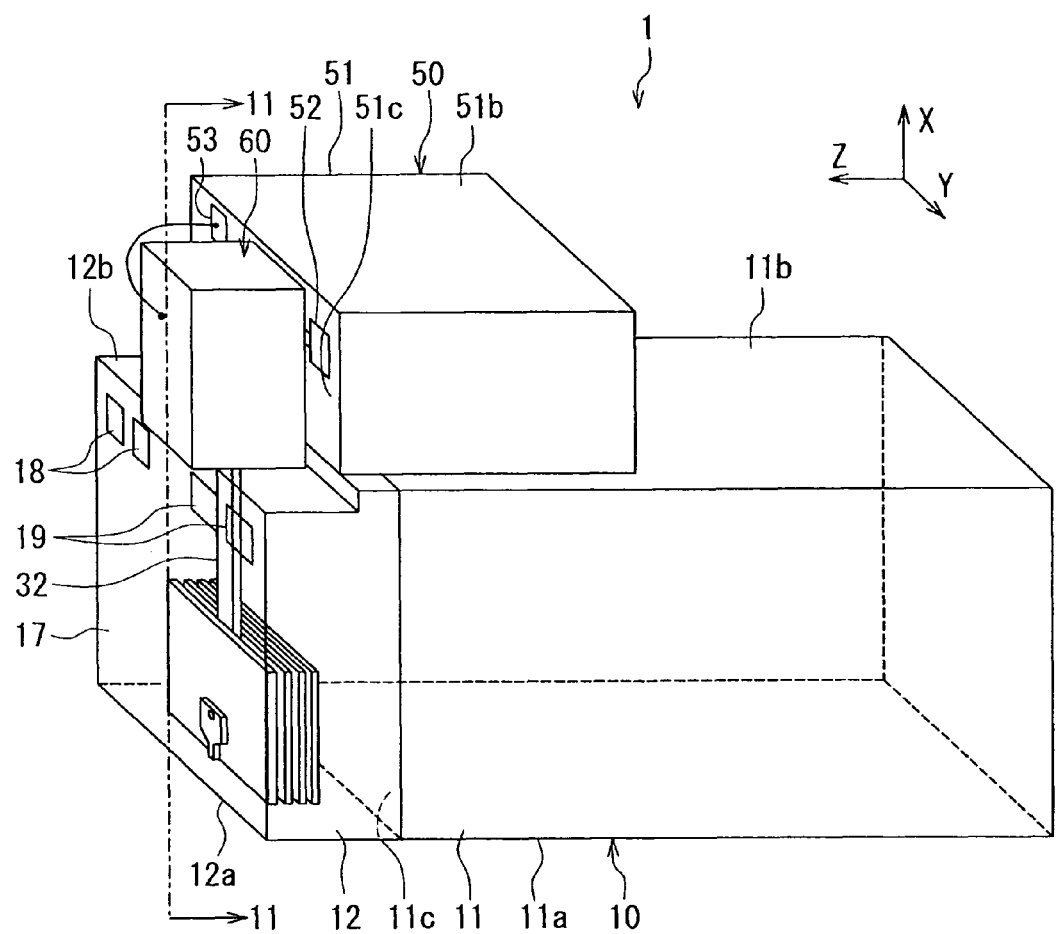
FIG. 10 is a perspective view showing the thermally-assisted magnetic recording head according to the first embodiment of the invention.
Figure 11:
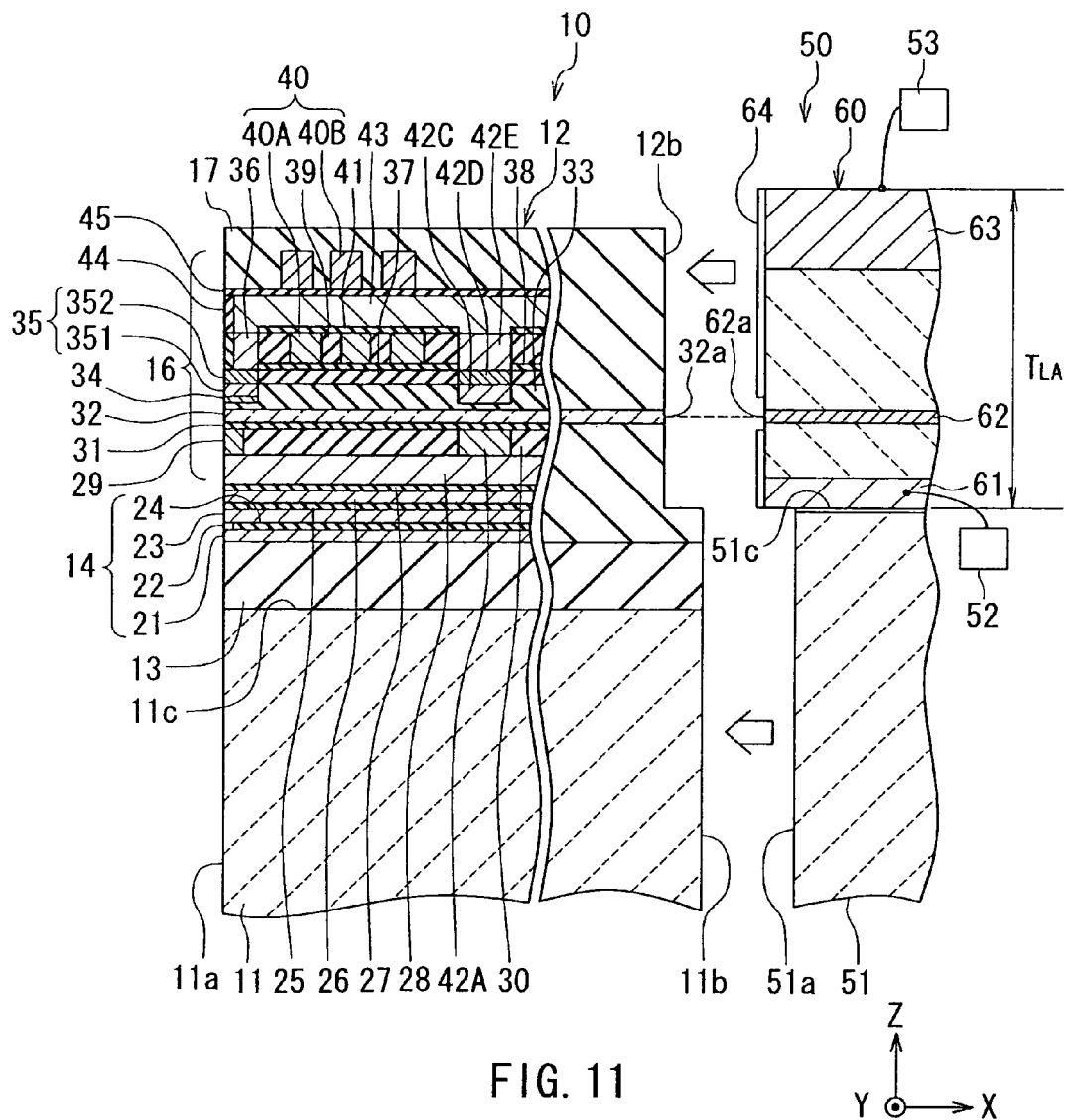
FIG. 11 shows a cross section taken along line 11-11 of FIG. 10.
Figure 12:
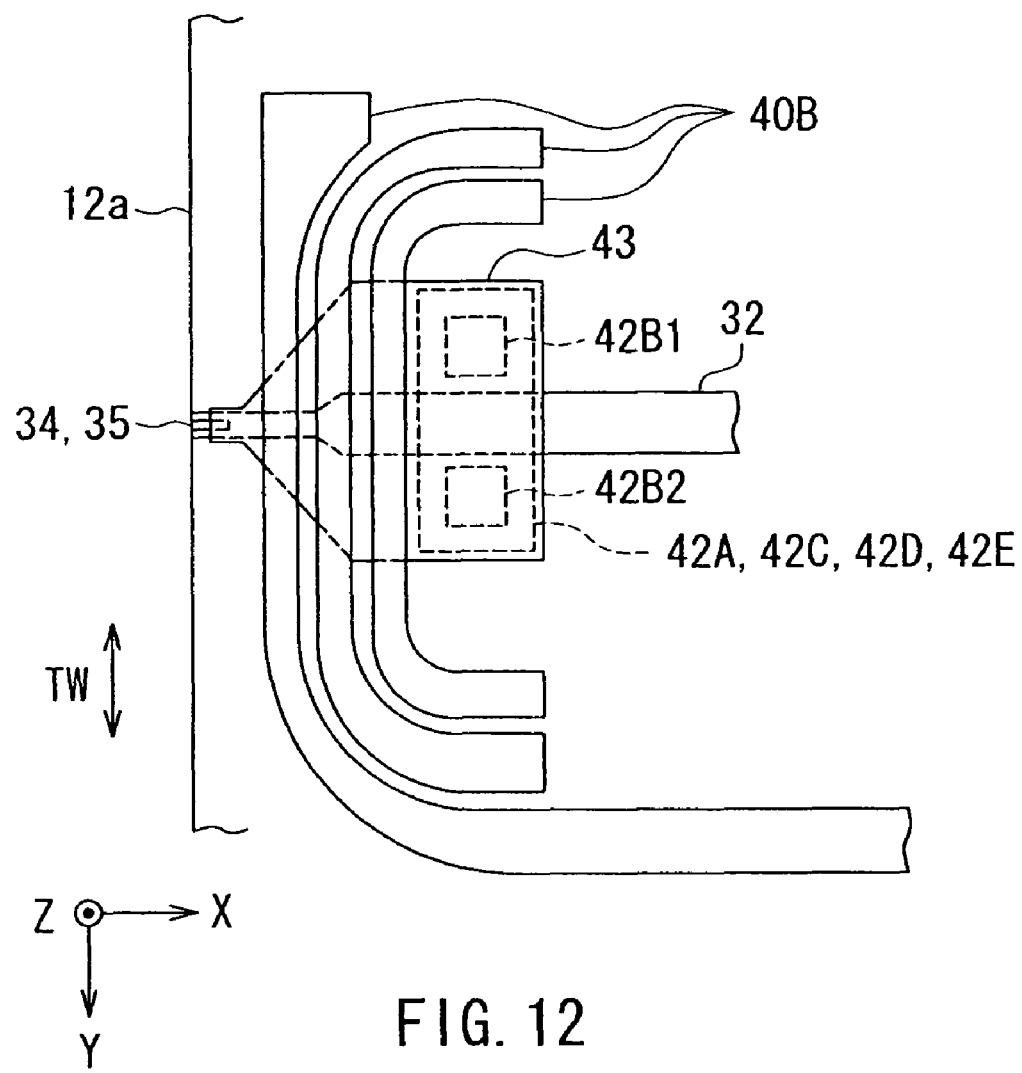
FIG. 12 is a plan view showing a part of the head unit of the thermally-assisted magnetic recording head according to the first embodiment of the invention.

The configuration of the thermally-assisted magnetic recording head 1 according to the present embodiment will now be described with reference to FIG. 10 to FIG. 12. FIG. 10 is a perspective view showing the thermally-assisted magnetic recording head 1. FIG. 11 shows a cross section taken along line 11-11 of FIG. 10. FIG. 12 is a plan view showing a part of a head unit of the thermally-assisted magnetic recording head. The thermally-assisted magnetic recording head 1 includes a slider 10 and a light source unit 50. FIG. 11 shows the state where the slider 10 and the light source unit 50 are separated from each other.

The slider 10 includes a slider substrate 11 and a head unit 12. The slider substrate 11 is rectangular-solid-shaped and is made of a ceramic material such as aluminum oxide-titanium carbide ($Al_2O_3$—TiC). The slider substrate 11 has a medium facing surface 11a that faces the magnetic disk 201, a rear surface lib on the opposite side from the medium facing surface 11a, and four surfaces that connect the medium facing surface 11a to the rear surface lib. One of the four surfaces that connect the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 with respect to the magnetic disk 201. The head unit 12 has a medium facing surface 12a that faces the magnetic disk 201, and a rear surface 12b on the opposite side from the medium facing surface 12a. The medium facing surface 12a is parallel to the medium facing surface 11a of the slider substrate 11.

Where the components of the head unit 12 are concerned, with respect to a reference position, a position located in a direction that is perpendicular to the element-forming surface 11c and gets away from the element-forming surface 11c is defined as "above", and a position located in a direction opposite to the above-mentioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 11. The Z direction is a direction perpendicular to the element-forming surface 11c and getting away from the element-forming surface 11c. The −X direction, the −Y direction, and the −Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is a direction parallel to the Y direction.

The light source unit 50 includes a laser diode 60 serving as a light source for emitting laser light, and a rectangular-solid-shaped support member 51 that supports the laser diode 60. The support member 51 is made of, for example, a ceramic material such as aluminum oxide-titanium carbide ($Al_2O_3$—TiC). The support member 51 has a bonding surface 51a, a rear surface 51b on the opposite side from the bonding surface 51a, and four surfaces that connect the bonding surface 51a to the rear surface 51b. One of the four surfaces that connect the bonding surface 51a to the rear surface 51b is a light-source-mounting surface 51c. The bonding surface 51a is the surface to be bonded to the rear surface 11b of the slider substrate 11. The light-source-mounting surface 51c is perpendicular to the bonding surface 51a and parallel to the element-forming surface 11c. The laser diode 60 is mounted on the light-source-mounting surface 51c. The support member 51 may have the function of a heat sink for dissipating heat generated by the laser diode 60, in addition to the function of supporting the laser diode 60.

As shown in FIG. 11, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 has the function of shielding the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the present embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; a coupling layer 42A disposed on the bottom yoke layer 28 at a position away from the medium facing surface 12a; and an insulating layer 30 disposed around the bottom yoke layer 28, the bottom shield layer 29 and the coupling layer 42A. The bottom yoke layer 28, the bottom shield layer 29, and the coupling layer 42A are each made of a soft magnetic material. The insulating layer 30 is made of an insulating material such as alumina.

The write head 16 further includes a waveguide that includes a core 32 and a clad. The clad of the present invention has a clad layer that constitutes at least part of the clad. In the present embodiment, the clad has a clad layer 31 and a clad layer 33. Of these clad layers, the clad layer 33 corresponds to the "clad layer that constitutes at least part of the clad" according to the present invention. The clad layer 31 is disposed over the bottom shield layer 29, the insulating layer 30 and the coupling layer 42A. The core 32 is disposed on the clad layer 31. The clad layer 33 covers the clad layer 31 and the core 32. The core 32 extends in the direction perpendicular to the medium facing surface 12a (X direction). The core 32 has an incident end 32a, an end face closer to the medium facing surface 12a, a top surface, a bottom surface, and two side surfaces. The end face of the core 32 may be located in the medium facing surface 12a or away from the medium facing surface 12a. FIG. 11 shows an example where the end face of the core 32 is located in the medium facing surface 12a. The core 32 propagates laser light that is emitted from the laser diode 60 and incident on the incident end 32a.

The core 32 is made of a dielectric material that transmits the laser light. Each of the clad layers 31 and 33 is made of a dielectric material and has a refractive index lower than that of the core 32. For example, if the laser light has a wavelength of 600 nm and the core 32 is made of $Al_2O_3$ (refractive index n=1.63), the clad layers 31 and 33 may be made of $SiO_2$ (refractive index n=1.46). If the core 32 is made of tantalum oxide such as $Ta_2O_5$ (n=2.16), the clad layers 31 and 33 may be made of $SiO_2$ (n=1.46) or $Al_2O_3$ (n=1.63).

The write head 16 further includes: a plasmon generator 34 disposed above the core 32 near the medium facing surface 12a; and a magnetic pole 35 disposed at such a position that the plasmon generator 34 is interposed between the magnetic pole 35 and the core 32. The plasmon generator 34 is made of a conductive material such as metal. For example, the plasmon generator 34 may be made of one element selected from the group consisting of Pd, Pt, Rh, Ir, Ru, Au, Ag, Cu, and Al, or of an alloy composed of two or more of these elements. The magnetic pole 35 includes a first layer 351, and a second layer 352 on the first layer 351. The magnetic pole 35 is made of a soft magnetic material, or a magnetic metal material in particular. The shapes and locations of the core 32, the plasmon generator 34 and the magnetic pole 35 will be detailed later.

The write head 16 further includes a coupling layer 42C embedded in the clad layer 33 at a position away from the medium facing surface 12a, and a coupling layer 42D on the coupling layer 42C. The coupling layers 42C and 42D are located above the coupling layer 42A. The coupling layers 42C and 42D are each made of a soft magnetic material.

As shown in FIG. 12, the write head 16 further includes two coupling portions 42B1 and 42B2 embedded in the clad layers 31 and 33. The coupling portions 42B1 and 42B2 are each made of a soft magnetic material. The coupling portions 42B1 and 42B2 are located on opposite sides of the core 32 in the track width direction TW, each at a distance from the core 32. The bottom surfaces of the coupling portions 42B1 and 42B2 are in contact with the top surface of the coupling layer 42A. The top surfaces of the coupling portions 42B1 and 42B2 are in contact with the bottom surface of the coupling layer 42C.

The write head 16 further includes: an insulating layer 37 disposed around the second layer 352 and the coupling layer 42D on the clad layer 33; an insulating layer 38 disposed on the insulating layer 37; a coupling layer 36 disposed on the second layer 352; and a coupling layer 42E disposed on the coupling layer 42D.

The write head 16 further includes a plurality of first coil elements 40A disposed on the insulating layer 38, and an insulating layer 39 disposed around the coupling layers 36 and 42E and the first coil elements 40A. The first coil elements 40A are arranged to align in the X direction. Although not shown, the first coil elements 40A each have a main part that extends in the track width direction TW (Y direction). The first coil elements 40A are each made of a conductive material such as copper. The coupling layers 36 and 42E are each made of a soft magnetic material. The insulating layers 37, 38, and 39 are made of alumina, for example.

The write head 16 further includes an insulating layer 41 disposed to cover the first coil elements 40A, a top yoke layer 43 disposed over the coupling layers 36 and 42E and the insulating layer 41, and an insulating layer 44 disposed around the top yoke layer 43. The top yoke layer 43 is in contact with the top surface of the coupling layer 36 at a position near the medium facing surface 12a, and in contact with the top surface of the coupling layer 42E at a position away from the medium facing surface 12a. The top yoke layer 43 is made of a soft magnetic material. The insulating layers 41 and 44 are each made of an insulating material such as alumina.

The write head 16 further includes an insulating layer 45 disposed over the top yoke layer 43 and the insulating layer 44, and a plurality of second coil elements 40B disposed on the insulating layer 45. The insulating layer 45 is made of an insulating material such as alumina.

FIG. 12 shows the second coil elements 40B. The second coil elements 40B are arranged to align in the X direction. The second coil elements 40B each have a main part that extends in the track width direction TW (Y direction). The second coil elements 40B are each made of a conductive material such as copper.

Although not shown, the thermally-assisted magnetic recording head 1 further includes a plurality of connecting portions. The plurality of connecting portions connect the plurality of first coil elements 40A to the plurality of second coil elements 40B so as to form a coil 40 wound around the top yoke layer 43 helically. The plurality of connecting portions are provided to penetrate the insulating layers 41, 44, and 45. The connecting portions are each made of a conductive material such as copper.

In the write head 16, the bottom shield layer 29, the bottom yoke layer 28, the coupling layer 42A, the coupling portions 42B1 and 42B2, the coupling layers 42C, 42D and 42E, the top yoke layer 43, the coupling layer 36, and the magnetic pole 35 form a magnetic path for passing a magnetic flux corresponding to the magnetic field produced by the coil 40. The magnetic pole 35 has an end face located in the medium facing surface 12a, allows the magnetic flux corresponding to the magnetic field produced by the coil 40 to pass, and produces a write magnetic field for writing data on the magnetic disk 201 by means of the perpendicular magnetic recording system. The bottom shield layer 29 takes in a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 11, the protection layer 17 is disposed to cover the write head 16. As shown in FIG. 10, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 40. These terminals 18 and 19 are electrically connected to the plurality of pad-shaped terminals of the wiring member 224 shown in FIG. 9.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example.

As shown in FIG. 11, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 μm, for example.

The light source unit 50 further includes a terminal 52 disposed on the light-source-mounting surface 51c and electrically connected to the lower electrode 61, and a terminal 53 disposed on the light-source-mounting surface 51c and electrically connected to the upper electrode 63. These terminals 52 and 53 are electrically connected to the plurality of pad-shaped terminals of the wiring member 224 shown in FIG. 9. When a predetermined voltage is applied to the laser diode 60 through the terminals 52 and 53, laser light is emitted from the emission center 62a of the laser diode 60. The laser light to be emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is fixed to the slider 10 by bonding the bonding surface 51a of the support member 51 to the rear surface 11b of the slider substrate 11, as shown in FIG. 11. The laser diode 60 and the core 32 are positioned so that the laser light emitted from the laser diode 60 will be incident on the incident end 32a of the core 32.

Figure 1:
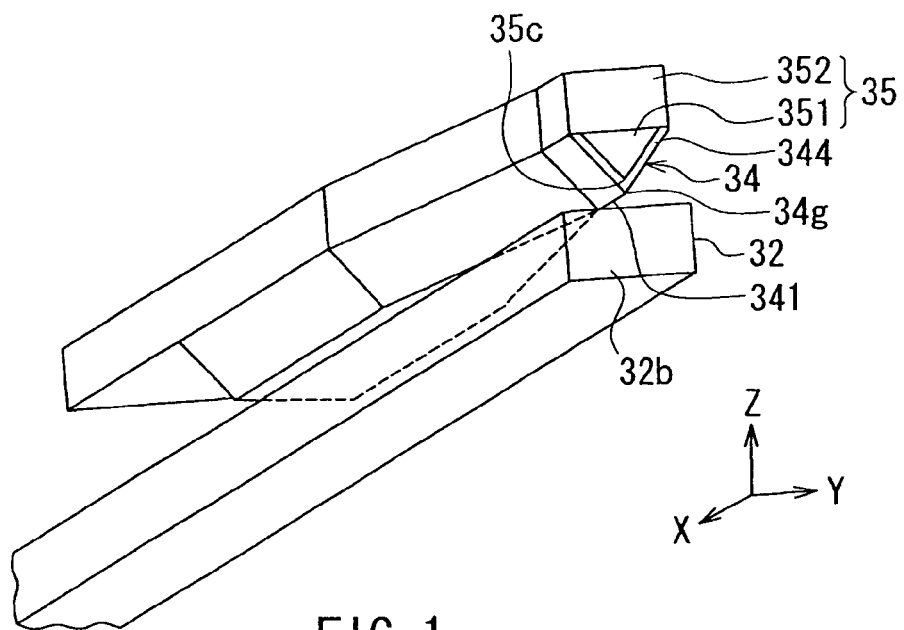
FIG. 1 is a perspective view showing a waveguide's core, a plasmon generator, and a magnetic pole of a thermally-assisted magnetic recording head according to a first embodiment of the invention.
Figure 2:
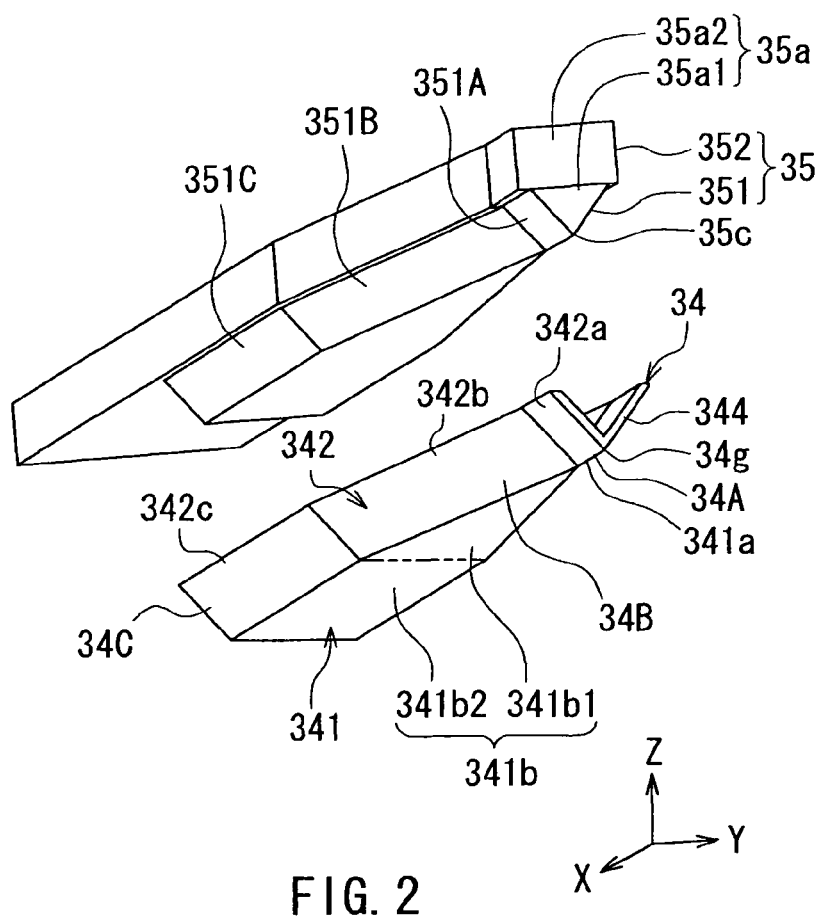
FIG. 2 is an exploded perspective view of the plasmon generator and the magnetic pole shown in FIG. 1.
Figure 3:
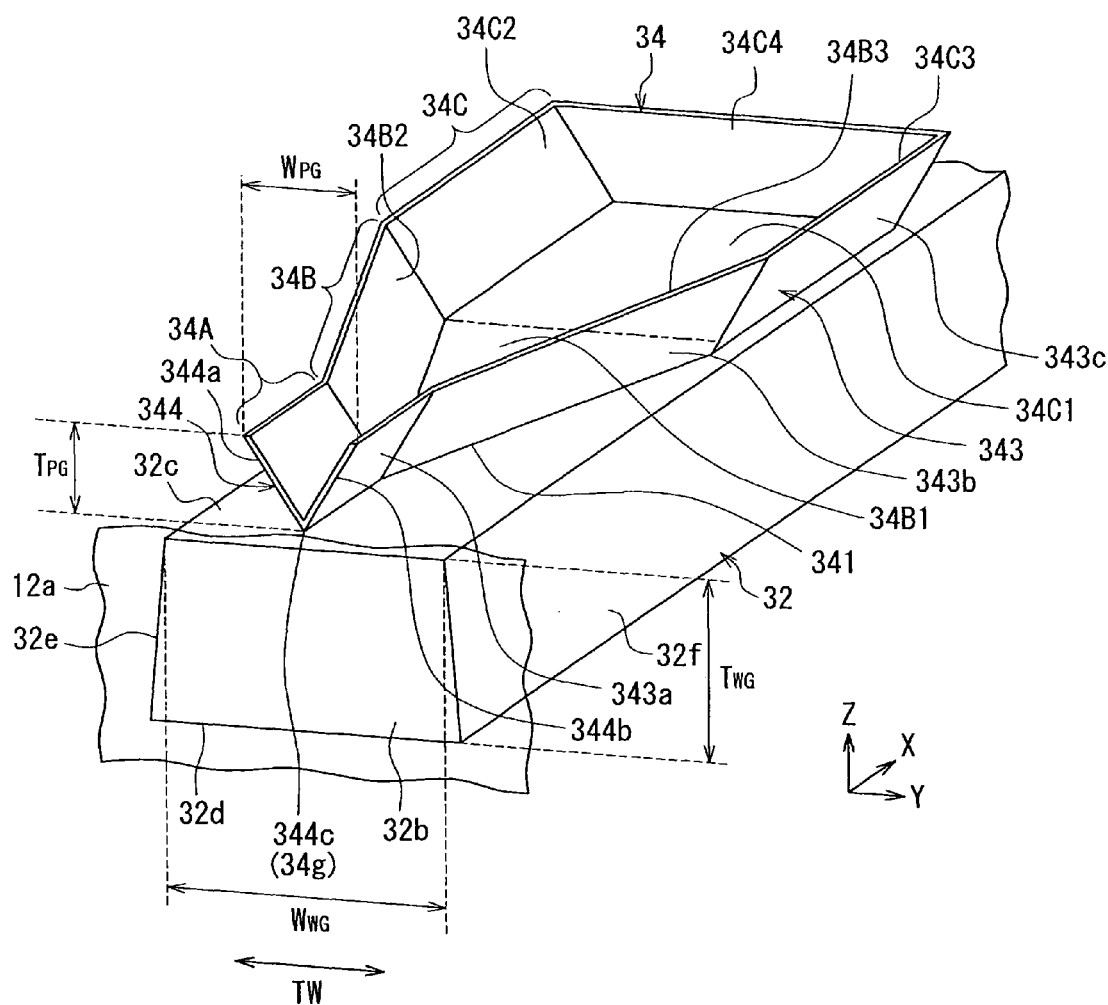
FIG. 3 is a perspective view showing the core and the plasmon generator shown in FIG. 1.
Figure 4:
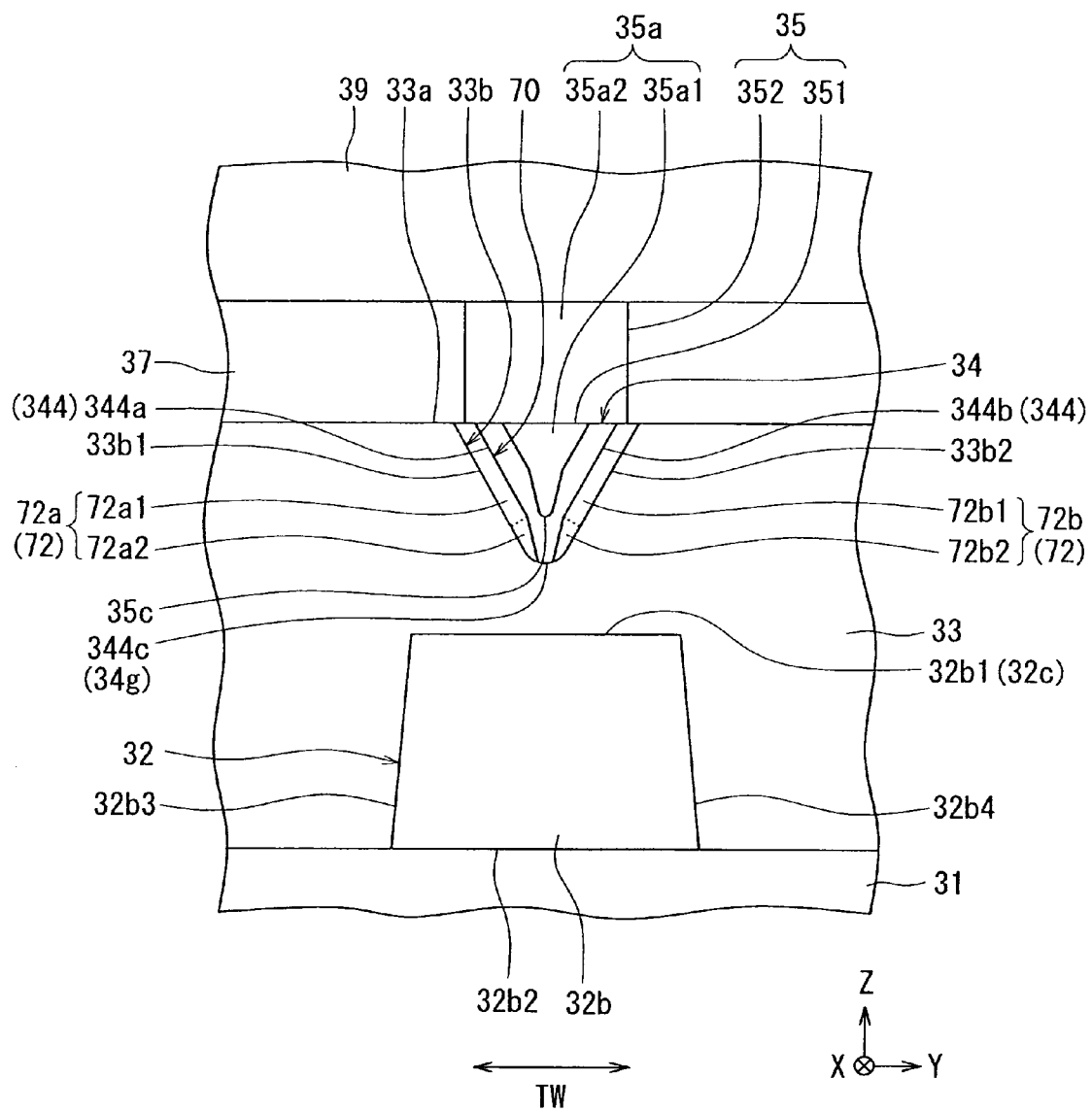
FIG. 4 is a front view showing a part of the medium facing surface of a head unit of the thermally-assisted magnetic recording head according to the first embodiment of the invention.
Figure 5:
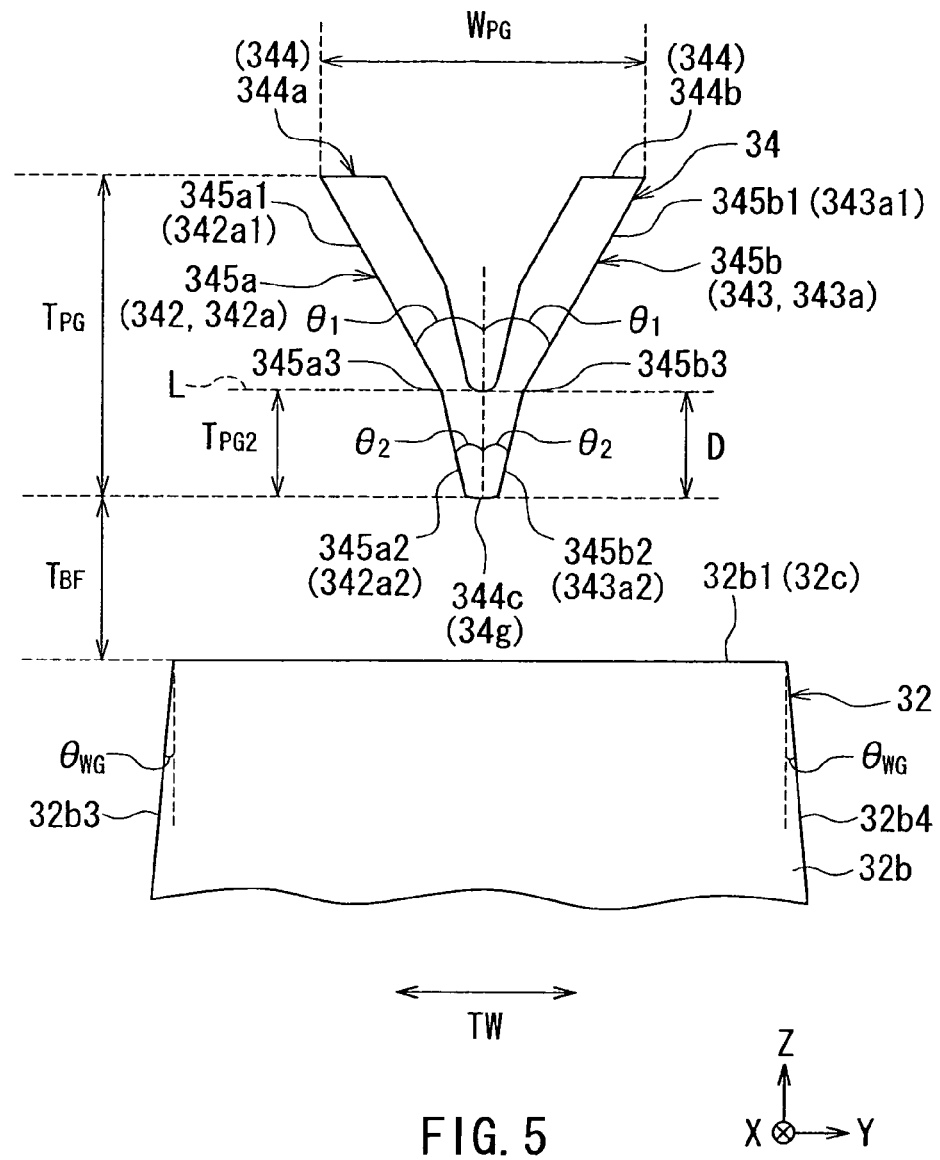
FIG. 5 is an enlarged front view of a part of the core and the plasmon generator shown in FIG. 4.
Figure 6:
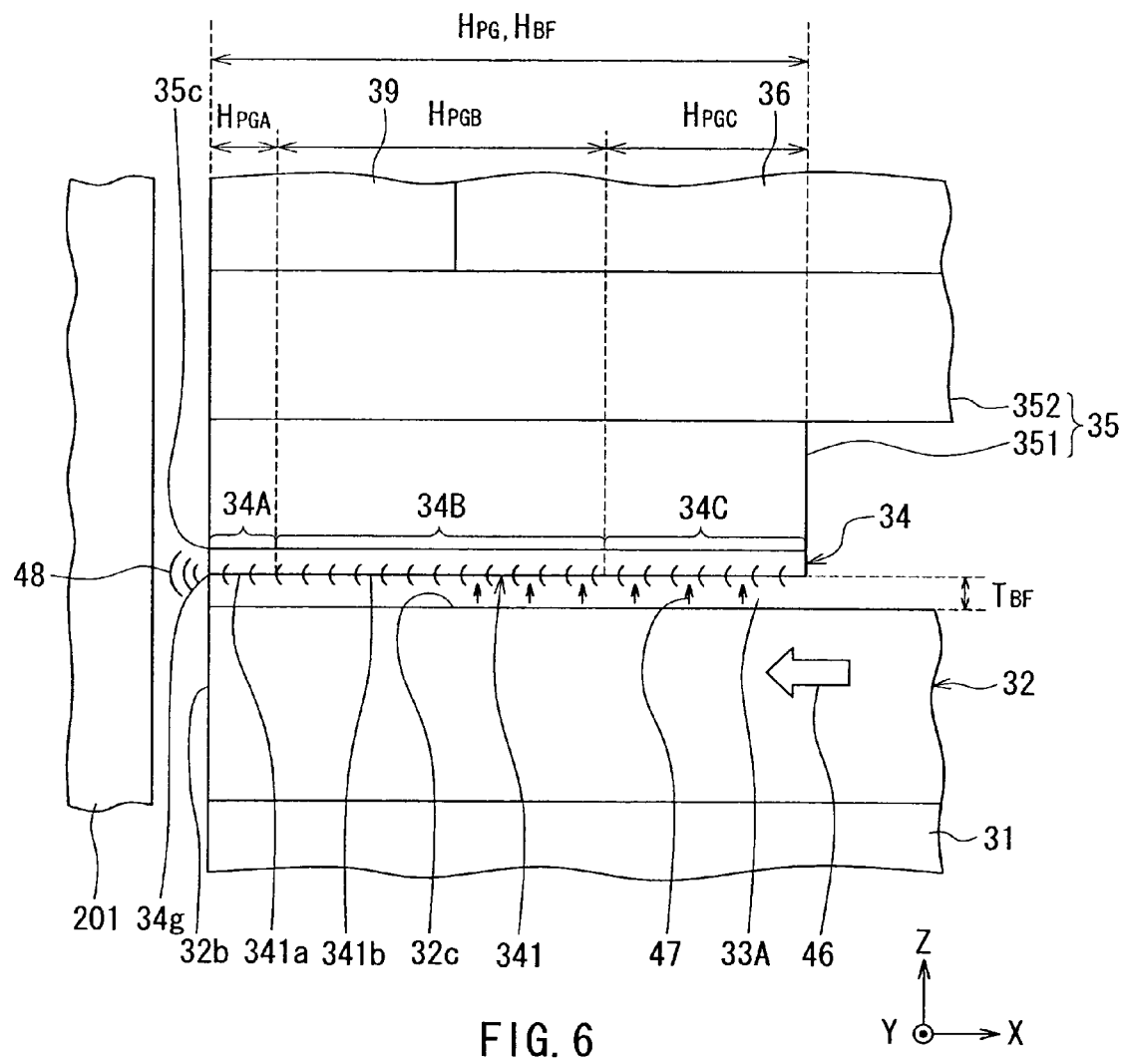
FIG. 6 is a cross-sectional view showing the core, the plasmon generator, and the magnetic pole of the thermally-assisted magnetic recording head according to the first embodiment of the invention.
Figure 7:
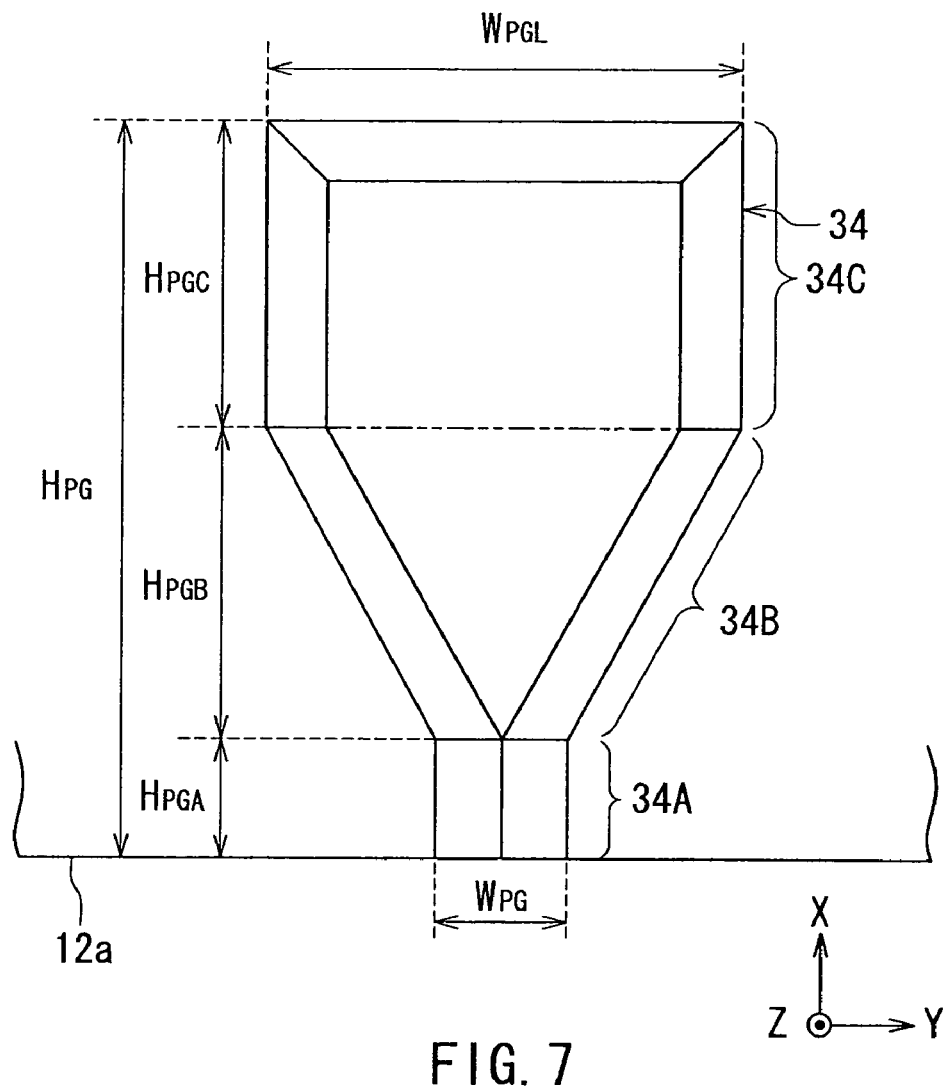
FIG. 7 is a plan view of the plasmon generator shown in FIG. 1.

The shapes and locations of the core 32, the plasmon generator 34, and the magnetic pole 35 will now be described in detail with reference to FIG. 1 to FIG. 6. FIG. 1 is a perspective view showing the core 32, the plasmon generator 34, and the magnetic pole 35. FIG. 2 is an exploded perspective view of the plasmon generator 34 and the magnetic pole 35 shown in FIG. 1. FIG. 3 is a perspective view showing the core 32 and the plasmon generator 34. FIG. 4 is a front view showing a part of the medium facing surface 12a of the head unit 12. FIG. 5 is an enlarged front view of a part of the core 32 and the plasmon generator 34 shown in FIG. 4. FIG. 6 is a cross-sectional view showing the core 32, the plasmon generator 34, and the magnetic pole 35. FIG. 7 is a plan view of the plasmon generator 34.

Aside from the incident end 32a shown in FIG. 11, the core 32 further has: an end face 32b that is closer to the medium facing surface 12a; an evanescent light generating surface 32c which is a top surface; a bottom surface 32d; and two side surfaces 32e and 32f, as shown in FIG. 3. The evanescent light generating surface 32c generates evanescent light based on the light propagated through the core 32. While FIG. 1 to FIG. 6 show an example where the end face 32b is located in the medium facing surface 12a, the end face 32b may be located away from the medium facing surface 12a. The end face 32b includes a top side 32b1, a bottom side 32b2, and two sides 32b3 and 32b4 connecting the top side and the bottom side to each other. In the vicinity of the plasmon generator 34A, the core 32 has a trapezoidal shape in cross section parallel to the medium facing surface 12a, the trapezoidal shape being such that the top side is shorter than the bottom side, for example. In such a case, the end face 32b has a trapezoidal shape with its top side 32b1 shorter than the bottom side 32b2. The two sides 32b3 and 32b4 form the same angle with respect to the direction perpendicular to the top side 32b1.

As shown in FIG. 4, the clad layer 33 has a top surface 33a that is located above the core 32, and a groove 33b that opens in the top surface 33a and is located above the core 32. The groove 33b has a shape corresponding to the plasmon generator 34. The groove 33b includes a V-shaped groove portion that has an end located in the medium facing surface 12a. The V-shaped groove portion extends in the direction perpendicular to the medium facing surface 12a (X direction). The V-shaped groove portion is V-shaped in cross section parallel to the medium facing surface 12a. The V-shaped groove portion has first and second sidewalls 33b1 and 33b2 that decrease in distance from each other with increasing distance from the top surface 33a of the clad layer 33.

As shown in FIG. 4, the thermally-assisted magnetic recording head 1 further includes a dielectric film 72 disposed at least in the V-shaped groove portion of the groove 33b. The groove 33b and the dielectric film 72 constitute an accommodating part 70 for accommodating the plasmon generator 34. As will be described later, the dielectric film 72 is intended for determining the shape of the plasmon generator 34. The dielectric film 72 is made of a dielectric material and has a refractive index lower than that of the core 32. The dielectric film 72 may be made of the same material as that of the clad layer 33.

The dielectric film 72 includes a first film portion 72a that adheres to the first sidewall 33b1, and a second film portion 72b that adheres to the second sidewall 33b2. The first film portion 72a includes an upper part 72a1 and a lower part 72a2 that are continuous with each other. The second film portion 72b includes an upper part 72b1 and a lower part 72b2 that are continuous with each other. In FIG. 4, the border between the upper part 72a1 and the lower part 72a2 and the border between the upper part 72b1 and the lower part 72b2 are shown by respective dotted lines. In the first film portion 72a, the lower part 72a2 has a thickness smaller than that of the upper part 72a1 in the direction perpendicular to the first sidewall 33b1. In the second film portion 72b, the lower part 72b2 has a thickness smaller than that of the upper part 72b1 in the direction perpendicular to the second sidewall 33b2.

As shown in FIG. 2 and FIG. 3, the plasmon generator 34 has a V-shaped portion 34A that has an end face located in the medium facing surface 12a. The V-shaped portion 34A extends in the direction perpendicular to the medium facing surface 12a (X direction). The V-shaped portion 34A is V-shaped in cross section parallel to the medium facing surface 12a. The V-shaped groove portion of the groove 33b described above is to accommodate the V-shaped portion 34A. The V-shaped portion 34A is accommodated in the V-shaped groove portion so that the first film portion 72a is interposed between the first sidewall 33b1 and the V-shaped portion 34A and the second film portion 72b is interposed between the second sidewall 33b2 and the V-shaped portion 34A.

The plasmon generator 34 further has a second portion 34B and a third portion 34C. The second portion 34B is located farther from the medium facing surface 12a than is the V-shaped portion 34A, such that the second portion 34B is continuous with the V-shaped portion 34A. The third portion 34C is located farther from the medium facing surface 12a than is the second portion 34B, such that the third portion 34C is continuous with the second portion 34B. In FIG. 3 and FIG. 7, the border between the second portion 34B and the third portion 34C is shown by a chain double-dashed line.

The second portion 34B has: a bottom part 34B1 that is shaped like a plate and faces the evanescent light generating surface 32c; and two sidewall parts 34B2 and 34B3 that are each shaped like a plate. The sidewall parts 34B2 and 34B3 are located farther from the evanescent light generating surface 32c than is the bottom part 34B1, and are connected to opposite ends of the bottom part 34B1 in the direction parallel to the medium facing surface 12a and the evanescent light generating surface 32c (Y direction).

The bottom part 34B1 has a width that decreases with decreasing distance to the medium facing surface 12a, the width being in the direction parallel to the medium facing surface 12a and the evanescent light generating surface 32c (Y direction). The bottom part 34B1 has an end closer to the medium facing surface 12a. At this end of the bottom part 34B1, the bottom part 34B1 has a zero width and the respective bottom ends of the sidewall parts 34B2 and 34B3 are in contact with each other.

The distance between the two sidewall parts 34B2 and 34B3 in the direction parallel to the medium facing surface 12a and the evanescent light generating surface 32c (Y direction) increases with increasing distance from the evanescent light generating surface 32c, and decreases with decreasing distance to the medium facing surface 12a.

The third portion 34C has: a bottom part 34C1 that is continuous with the bottom part 34B1 of the second portion 34B; a sidewall part 34C2 that is continuous with the sidewall part 34B2 of the second portion 34B; a sidewall part 34C3 that is continuous with the sidewall part 34B3 of the second portion 34B; and a wall part 34C4 that connects respective ends of the bottom part 34C1 and the sidewall parts 34C2 and 34C3 to each other, the ends being farther from the medium facing surface 12a. The bottom part 34C1 has a constant width in the direction parallel to the medium facing surface 12a and the evanescent light generating surface 32c (Y direction) regardless of the distance from the medium facing surface 12a. Note that the third portion 34C need not necessarily have the wall part 34C4.

The distance between the two sidewall parts 34C2 and 34C3 in the direction parallel to the medium facing surface 12a and the evanescent light generating surface 32c (Y direction) increases with increasing distance from the evanescent light generating surface 32c, but does not change according to the distance from the medium facing surface 12a.

As shown in FIG. 3, the V-shaped portion 34A, the second portion 34B, and the third portion 34C of the plasmon generator 34 form inside a space for accommodating the first layer 351 of the magnetic pole 35.

The plasmon generator 34 has an outer surface including a plurality of portions described below, and has a near-field light generating part 34g located in the medium facing surface 12a. As shown in FIG. 2, the outer surface of the plasmon generator 34 includes a plasmon exciting part 341 that faces the evanescent light generating surface 32c of the core 32 with a predetermined distance therebetween. The near-field light generating part 34g lies at an end of the plasmon exciting part 341.

As shown in FIG. 6, the part of the clad layer 33 interposed between the evanescent light generating surface 32c and the plasmon exciting part 341 forms a buffer part 33A having a refractive index lower than that of the core 32.

As shown in FIG. 2, the plasmon exciting part 341 includes a propagative edge 341a and a flat surface part 341b. The propagative edge 341a is formed by the bottom end of the V-shaped portion 34A. The flat surface part 341b includes a width changing portion 341b1 formed by the bottom surface of the bottom part 34B1 of the second portion 34B, and a constant width portion 341b2 formed by the bottom surface of the bottom part 34C1 of the third portion 34C. In FIG. 2, the border between the width changing portion 341b1 and the constant width portion 341b2 is shown by a chain double-dashed line.

The width changing portion 341b1 has a width that decreases with decreasing distance to the medium facing surface 12a, the width being in the direction parallel to the medium facing surface 12a and the evanescent light generating surface 32c (Y direction). The width changing portion 341b1 has a front end part that is closer to the medium facing surface 12a, and two sides that are opposite in the direction of the width (Y direction). The front end part of the width changing portion 341b1 is located at a distance from the medium facing surface 12a. The propagative edge 341a connects the front end part of the width changing portion 341b1 to the near-field light generating part 34g. The angle that one of the two sides of the width changing portion 341b1 forms with respect to the direction perpendicular to the medium facing surface 12a (X direction) is equal to the angle that the other of the two sides forms with respect to the direction perpendicular to the medium facing surface 12a (X direction). This angle falls within the range of 3 to 50 degrees, and preferably within the range of 10 to 25 degrees.

The constant width portion 341b2 is located farther from the medium facing surface 12a than is the width changing portion 341b1, such that the constant width portion 341b2 is continuous with the width changing portion 341b1. The constant width portion 341*b*2 has a constant width in the direction parallel to the medium facing surface 12*a* and the evanescent light generating surface 32*c* (Y direction) regardless of the distance from the medium facing surface 12*a*.

As shown in FIG. 2 and FIG. 3, the outer surface of the plasmon generator 34 further includes a first inclined surface 342 and a second inclined surface 343 that are each connected to the plasmon exciting part 341. The first and second inclined surfaces 342 and 343 increase in distance from each other with increasing distance from the plasmon exciting part 341. The plasmon exciting part 341 connects respective ends of the inclined surfaces 342 and 343 to each other, the ends being closer to the evanescent light generating surface 32*c*.

As shown in FIG. 2, the first inclined surface 342 includes an inclined surface 342*a* that is included in the V-shaped portion 34A, an inclined surface 342*b* that is included in the second portion 34B, and an inclined surface 342*c* that is included in the third portion 34C. As shown in FIG. 3, the second inclined surface 343 includes an inclined surface 343*a* that is included in the V-shaped portion 34A, an inclined surface 343*b* that is included in the second portion 34B, and an inclined surface 343*c* that is included in the third portion 34C.

The inclined surfaces 342*a* and 343*a* are formed by the surfaces of the V-shaped portion 34A that lie on opposite sides in the direction parallel to the medium facing surface 12*a* and the evanescent light generating surface 32*c* (Y direction). The propagative edge 341*a* connects respective ends of the inclined surfaces 342*a* and 343*a* to each other, the respective ends being closer to the evanescent light generating surface 32*c*. In a cross section parallel to the medium facing surface 12*a*, the propagative edge 341*a* is shaped like a pointed edge in a macroscopic view, but has an arc shape in a microscopic view.

The inclined surfaces 342*b* and 343*b* are formed by the respective surfaces of the sidewall parts 34B2 and 34B3 of the second portion 34B that lie on opposite sides in the direction parallel to the medium facing surface 12*a* and the evanescent light generating surface 32*c* (Y direction). The width changing portion 341*b*1 connects respective ends of the inclined surfaces 342*b* and 343*b* to each other, the respective ends being closer to the evanescent light generating surface 32*c*.

The inclined surfaces 342*c* and 343*c* are formed by the respective surfaces of the sidewall parts 34C2 and 34C3 of the third portion 34C that lie on opposite sides in the direction parallel to the medium facing surface 12*a* and the evanescent light generating surface 32*c* (Y direction). The constant width portion 341*b*2 connects respective ends of the inclined surfaces 342*c* and 343*c* to each other, the respective ends being closer to the evanescent light generating surface 32*c*.

As shown in FIG. 5, the inclined surface 342*a* includes an upper part 342*a*1 and a lower part 342*a*2 that are continuous with each other. The inclined surface 343*a* includes an upper part 343*a*1 and a lower part 343*a*2 that are continuous with each other. Here, the angles that the upper parts 342*a*1 and 343*a*1 and the lower parts 342*a*2 and 343*a*2 form with respect to the direction perpendicular to the evanescent light generating surface 32*c* will be referred to as their respective inclination angles. The upper parts 342*a*1 and 343*a*1 have the same inclination angle. This angle will hereinafter be represented by the symbol $\theta_1$. The lower parts 342*a*2 and 343*a*2 have the same inclination angle. This angle will hereinafter be represented by the symbol $\theta_2$. The angle $\theta_2$ is smaller than the angle $\theta_1$.

The angle formed between the upper part 342*a*1 and the upper part 343*a*1 is twice the inclination angle $\theta_1$ of each of the upper parts 342*a*1 and 343*a*1, i.e., $2\theta_1$. The angle formed between the lower part 342*a*2 and the lower part 343*a*2 is twice the inclination angle $\theta_2$ of each of the lower parts 342*a*2 and 343*a*2, i.e., $2\theta_2$. The angle $2\theta_2$ is smaller than the angle $2\theta_1$.

The wave number of the surface plasmons to be excited on the plasmon generator 34 varies according to the shape of the plasmon generator 34. The shape of the plasmon generator 34 depends largely on the magnitude of the angle $\theta_1$ in particular, between the two types of angles $\theta_1$ and $\theta_2$. Between the two types of angles $\theta_1$ and $\theta_2$, the angle $\theta_1$ in particular is a parameter that affects the wave number of the surface plasmons to be excited on the plasmon generator 34. The angle $\theta_2$ is a parameter that affects the spot diameter of the near-field light to be generated by the near-field light generating part 34*g*. The angle $\theta_1$ preferably falls within the range of 15 to 60 degrees. The angle $\theta_2$ preferably falls within the range of 10 to 20 degrees.

As shown in FIG. 4, the outer surface of the plasmon generator 34 further includes a front end face 344 that is located in the medium facing surface 12*a* and connected to the first and second inclined surfaces 342 and 343. The front end face 344 is also the end face of the V-shaped portion 34A. The front end face 344 has first and second portions 344*a* and 344*b* that are connected to each other into a V-shape. The front end face 344 further has a bottom end 344*c* that is closer to the evanescent light generating surface 32*c*. The bottom end 344*c* forms the near-field light generating part 34*g*. The bottom end 344*c* is shaped like a pointed edge in a macroscopic view, but has an arc shape in a microscopic view.

As shown in FIG. 5, the first portion 344*a* includes a first side 345*a* that lies at an end of the first inclined surface 342 (inclined surface 342*a*). The second portion 344*b* includes a second side 345*b* that lies at an end of the second inclined surface 343 (inclined surface 343*a*). The first and second sides 345*a* and 345*b* are each connected to the bottom end 344*c*.

The first side 345*a* includes an upper part 345*a*1 and a lower part 345*a*2 that are continuous with each other. The second side 345*b* includes an upper part 345*b*1 and a lower part 345*b*2 that are continuous with each other. In FIG. 5, the reference numeral 345*a*3 designates the border between the upper part 345*a*1 and the lower part 345*a*2, and the reference numeral 345*b*3 designates the border between the upper part 345*b*1 and the lower part 345*b*2. The angles that the upper parts 345*a*1 and 345*b*1 and the lower parts 345*a*2 and 345*b*2 form with respect to the direction perpendicular to the evanescent light generating surface 32*c* will be referred to as their respective inclination angles.

The inclination angle of the upper part 345*a*1 of the first side 345*a* is equal to the inclination angle $\theta_1$ of the upper part 342*a*1 of the inclined surface 342*a*. The inclination angle of the upper part 345*b*1 of the second side 345*b* is equal to the inclination angle $\theta_1$ of the upper part 343*a*1 of the inclined surface 343*a*. The inclination angles of the upper parts 345*a*1 and 345*b*1 are therefore equal.

The inclination angle of the lower part 345*a*2 of the first side 345*a* is equal to the inclination angle $\theta_2$ of the lower part 342*a*2 of the inclined surface 342*a*. The inclination angle of the lower part 345*b*2 of the second side 345*b* is equal to the inclination angle $\theta_2$ of the lower part 343*a*2 of the inclined surface 343*a*. The inclination angles of the lower parts 345*a*2 and 345*b*2 are therefore equal.

The angle formed between the upper part 345*a*1 and the upper part 345*b*1 is twice the inclination angle $\theta_1$ of each of the upper parts 345*a*1 and 345*b*1, i.e., $2\theta_1$. The angle formed between the lower part 345*a*2 and the lower part 345*b*2 is twice the inclination angle $\theta_2$ of each of the lower parts 345a2 and 345b2, i.e., $2\theta_2$. The angle $2\theta_2$ is smaller than the angle $2\theta_1$.

As shown in FIG. 2 and FIG. 4, the magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a.

The first layer 351 of the magnetic pole 35 is accommodated in the space formed by the V-shaped portion 34A, the second portion 34B, and the third portion 34C of the plasmon generator 34. The first layer 351 includes a first portion 351A, a second portion 351B, and a third portion 351C. The first portion 351A is accommodated in the space formed by the V-shaped portion 34A. The second portion 351B is accommodated in the space formed by the second portion 34B (the bottom part 34B1 and the sidewall parts 34B2 and 34B3). The third portion 351C is accommodated in the space formed by the third portion 34C (the bottom part 34C1 and the sidewall parts 34C2 and 34C3).

The first portion 351A is generally triangular-prism-shaped. The first portion 351A is accommodated in the V-shaped portion 34A and is in contact with the V-shaped portion 34A. The first portion 351A has a constant width in the direction parallel to the medium facing surface 12a and the evanescent light generating surface 32c (Y direction) regardless of the distance from the medium facing surface 12a. The end face of the first portion 351A located in the medium facing surface 12a, i.e., the end face 35a1 of the first layer 351 located in the medium facing surface 12a, is generally triangle-shaped and is interposed between the two portions 344a and 344b of the front end face 344 of the plasmon generator 34. The end face 35a1 has a tip 35c located at its bottom end.

The second portion 351B is interposed between the two sidewall parts 34B2 and 34B3 of the second portion 34B of the plasmon generator 34, and is in contact with the bottom part 34B1 and the two sidewall parts 34B2 and 34B3. The width of the second portion 351B in the direction parallel to the medium facing surface 12a and the evanescent light generating surface 32c (Y direction) increases with increasing distance from the evanescent light generating surface 32c, and decreases with decreasing distance to the medium facing surface 12a.

The third portion 351C is interposed between the two sidewall parts 34C2 and 34C3 of the third portion 34C of the plasmon generator 34, and is in contact with the bottom part 34C1 and the two sidewall parts 34C2 and 34C3. The width of the third portion 351C in the direction parallel to the medium facing surface 12a and the evanescent light generating surface 32c (Y direction) increases with increasing distance from the evanescent light generating surface 32c, but does not change according to the distance from the medium facing surface 12a.

The second layer 352 of the magnetic pole 35 has a bottom surface that is in contact with the top surface of the first layer 351 and the respective top end surfaces of the V-shaped portion 34A, the second portion 34B and the third portion 34C of the plasmon generator 34.

The plasmon generator 34 need not necessarily have the third portion 34C. If the plasmon generator 34 does not have the third portion 34C, the first layer 351 of the magnetic pole 35 does not have the third portion 351C.

As shown in FIG. 3, the width of the evanescent light generating surface 32c in the track width direction TW (Y direction) in the vicinity of the plasmon generator 34 will be represented by the symbol $W_{WG}$. The thickness (dimension in the Z direction) of the core 32 in the vicinity of the plasmon generator 34 will be represented by the symbol $T_{WG}$. $W_{WG}$ falls within the range of 0.3 to 100 µm, for example. $T_{WG}$ falls within the range of 0.1 to 4 µm, for example. As shown in FIG. 12, the core 32 excluding the part in the vicinity of the plasmon generator 34 may have a width greater than $W_{WG}$. As shown in FIG. 5, the angle that each of the two sides 32b3 and 32b4 of the end face 32b of the core 32 forms with respect to the direction perpendicular to the top side 32b1 will be represented by the symbol $\theta_{WG}$. The angle $\theta_{WG}$ is 5 degrees, for example As shown in FIG. 3 and FIG. 5, the dimension of the plasmon generator 34 in the track width direction TW (Y direction) at the medium facing surface 12a will be represented by the symbol $W_{PG}$. The dimension of the plasmon generator 34 in the Z direction at the medium facing surface 12a will be represented by the symbol $T_{PG}$. Both $W_{PG}$ and $T_{PG}$ are sufficiently smaller than the wavelength of the laser light to be propagated through the core 32. As shown in FIG. 5, the distance between a virtual straight line L and the bottom end 344c will be represented by the symbol $T_{PG2}$. The virtual straight line L passes through the border 345a3 between the upper part 345a1 and the lower part 345a2 of the first side 345a and the border 345b3 between the upper part 345b1 and the lower part 345b2 of the second side 345b. $T_{PG2}$ is smaller than $T_{PG}$. $T_{PG2}$ preferably falls within the range of 10 to 25 nm. The reason will be detailed later. As shown in FIG. 7, the dimension of the third portion 34C of the plasmon generator 34 in the track width direction TW (Y direction) will be represented by the symbol $W_{PGL}$. $W_{PGL}$ falls within the range of 350 to 450 nm, for example.

When $T_{PG2}$ is sufficiently smaller than $T_{PG}$, the relationship between $W_{PG}$, $T_{PG}$, and $\theta_1$ is generally expressed by the following equation:

$$W_{PG} = 2 \times T_{PG} \times \tan \theta_1.$$

For example, when $\theta_1$ is 28 degrees and $T_{PG}$ is in the range of 50 to 250 nm, $W_{PG}$ falls within the range of 53 to 266 nm.

As shown in FIG. 6 and FIG. 7, the length of the plasmon generator 34 in the X direction will be represented by the symbol $H_{PG}$. $H_{PG}$ falls within the range of 0.6 to 4.0 µm, for example. The lengths of the V-shaped portion 34A, the second portion 34B, and the third portion 34C of the plasmon generator 34 in the X direction will be represented by the symbols $H_{PGA}$, $H_{PGB}$, and $H_{PLC}$, respectively. $H_{PGA}$ falls within the range of 0.01 to 1.0 µm, for example. $H_{PGB}$ falls within the range of 0.1 to 4.0 µm, for example. $H_{PLC}$ falls within the range of 0.0 to 3.9 µm, for example.

As shown in FIG. 6, the X-direction length of a portion of the plasmon exciting part 341 of the plasmon generator 34, the portion facing the evanescent light generating surface 32c, will be represented by the symbol $H_{BF}$. The distance between the plasmon exciting part 341 and the evanescent light generating surface 32c will be represented by the symbol $T_{BF}$. Both $H_{BF}$ and $T_{BF}$ are important parameters in achieving appropriate excitation and propagation of surface plasmons. $H_{BF}$ preferably falls within the range of 0.6 to 4.0 µm, and is preferably greater than the wavelength of the laser light to be propagated through the core 32. In the example shown in FIG. 6, the end face 32b of the core 32 is located in the medium facing surface 12a, so that $H_{BF}$ is equal to $H_{PG}$. $T_{BF}$ preferably falls within the range of 10 to 100 nm. As shown in FIG. 5, the distance between the bottom end 344c of the front end face 344 of the plasmon generator 34 and the end face 32b of the core 32 is equal to $T_{BF}$.

As shown in FIG. 5, the distance between the bottom end 344c of the front end face 344 of the plasmon generator 34 and the tip 35c (see FIG. 4) of the end face 35a1 of the first layer 351 of the magnetic pole 35 will be represented by the symbol D. D preferably falls within the range of 10 to 100 nm.

Reference is now made to FIG. 6 to describe the principle of generation of near-field light in the present embodiment and the principle of thermally-assisted magnetic recording using the near-field light. Laser light 46 emitted from the laser diode 60 is propagated through the core 32 of the waveguide to reach the vicinity of the plasmon generator 34. Here, the laser light 46 is totally reflected at the evanescent light generating surface 32c which is the interface between the core 32 and the buffer part 33A. This generates evanescent light 47 permeating into the buffer part 33A. Then, the evanescent light 47 and fluctuations of charges on the plasmon exciting part 341 of the outer surface of the plasmon generator 34 are coupled with each other to induce a surface plasmon polariton mode. In this way, surface plasmons are excited on the plasmon exciting part 341 through coupling with the evanescent light 47 generated from the evanescent light generating surface 32c.

The plasmon exciting part 341 includes the propagative edge 341a and the flat surface part 341b. The flat surface part 341b includes the width changing portion 341b1. The width of the width changing portion 341b1 in the direction parallel to the medium facing surface 12a and the evanescent light generating surface 32c (Y direction) decreases with decreasing distance to the medium facing surface 12a. The surface plasmons excited on the flat surface part 341b are gradually transformed into edge plasmons, which are surface plasmons to propagate along the two sides of the width changing portion 341b1 that are opposite in the direction of the width (Y direction), while propagating over the width changing portion 341b1. The surface plasmons (including edge plasmons) propagating over the width changing portion 341b1 reach the propagative edge 341a, and are transformed into edge plasmons to propagate along the propagative edge 341a. The propagative edge 341a propagates the edge plasmons that are based on the surface plasmons excited on the flat surface part 341b, and the edge plasmons that are excited on the propagative edge 341a. Those edge plasmons are propagated along the propagative edge 341a to the near-field light generating part 34g.

The foregoing edge plasmons concentrate at the near-field light generating part 34g, and near-field light 48 occurs from the near-field light generating part 34g based on the edge plasmons. The near-field light 48 is projected toward the magnetic disk 201, reaches the surface of the magnetic disk 201, and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

In the width changing portion 341b1, the propagating plasmons increase in electric field intensity. This is presumably based on the following first and second principles. Initially, a description will be given of the first principle. The wave number of the surface plasmons propagating over the width changing portion 341b1 increases as the width of the width changing portion 341b1 decreases. As the wave number of the surface plasmons increases, the speed of travel of the surface plasmons decreases. This consequently increases the energy density of the surface plasmons and enhances the electric field intensity of the surface plasmons.

Next, a description will be given of the second principle. When the surface plasmons propagate over the width changing portion 341b1, some of the surface plasmons impinge on the two sides of the width changing portion 341b1 that are opposite in the direction of the width (Y direction) to scatter, thereby generating a plurality of plasmons with different wave numbers. Some of the plurality of plasmons thus generated are transformed into edge plasmons having a wave number higher than that of the surface plasmons propagating over a flat surface. In this way, the surface plasmons are gradually transformed into the edge plasmons to propagate along the two sides, whereby the edge plasmons gradually increase in electric field intensity. As compared with the surface plasmons propagating over a flat surface, the edge plasmons are higher in wave number and lower in speed of travel. Consequently, the transformation of the surface plasmons into the edge plasmons increases the energy density of the plasmons. In the width changing portion 341b1, the foregoing transformation of the surface plasmons into the edge plasmons is accompanied by the generation of new surface plasmons based on the evanescent light occurring from the evanescent light generating surface 32c. The new surface plasmons are also transformed into edge plasmons. As a result, the edge plasmons increase in electric field intensity. Those edge plasmons are transformed into edge plasmons that propagate over the propagation edge 341a. This generates the edge plasmons that are higher in electric field intensity than the surface plasmons originally generated.

In the width changing portion 341b1, the surface plasmons propagating over the flat surface and the edge plasmons having a wave number higher than that of the surface plasmons coexist. It can be considered that both the surface plasmons and the edge plasmons increase in electric field intensity in the width changing portion 341b1 based on the first and second principles described above. In the width changing portion 341b1, the electric field intensity of the plasmons can thus be enhanced as compared with a case where either one of the first principle and the second principle is in operation.

Figure 13:
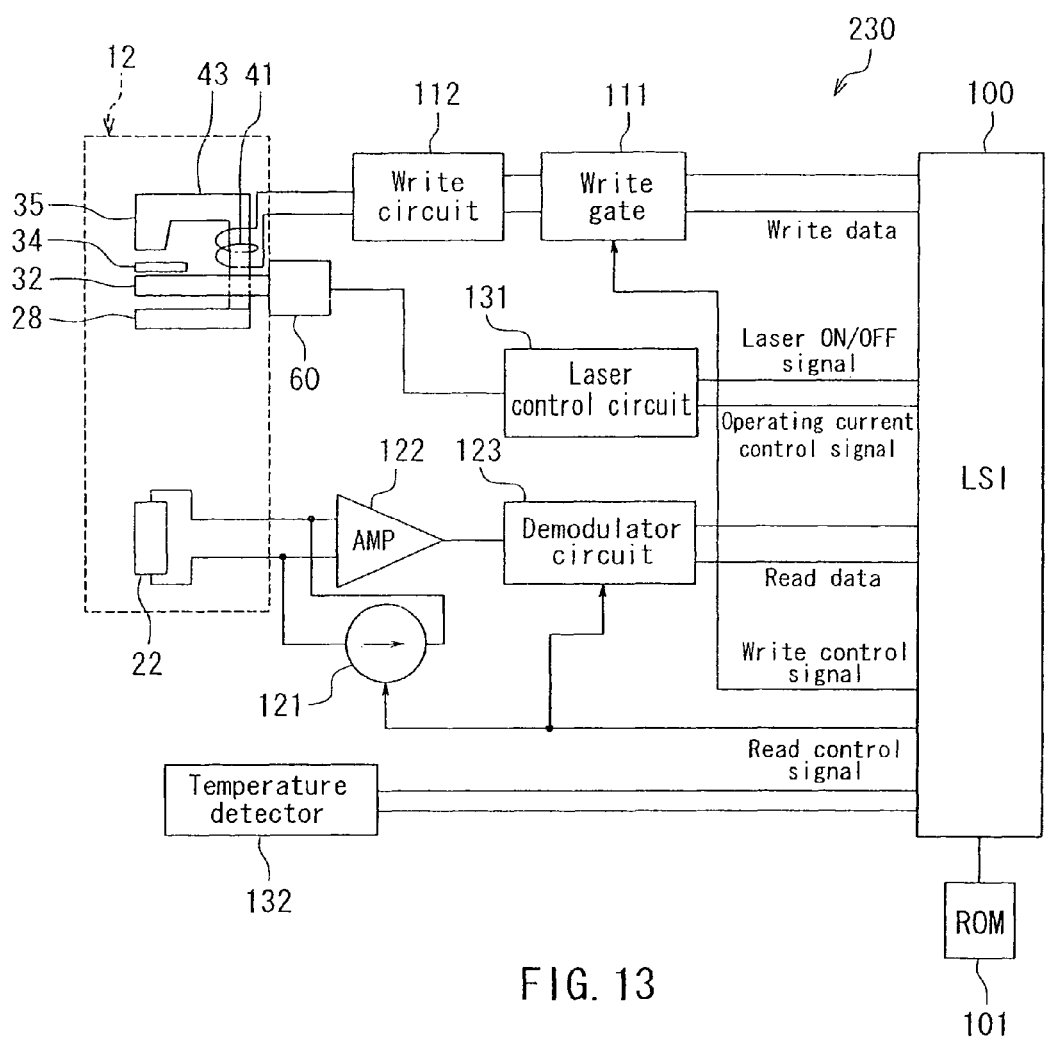
FIG. 13 is a block diagram showing the circuit configuration of the magnetic recording device according to the first embodiment of the invention.

Reference is now made to FIG. 13 to describe the circuit configuration of the control circuit 230 shown in FIG. 8 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 40.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 40. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light is propagated through the core 32. According to the principle of generation of near-field light described previously, the near-field light 48 occurs from the near-field light generating part 34g of the plasmon generator 34. The near-field light 48 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for performing data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 47, and data that indicates the temperature dependence of the coercivity of the magnetic recording layer.

As shown in FIG. 13, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the circuit configuration of the control circuit 230 is not limited to the one shown in FIG. 13.

Now, a description will be given of a method of manufacturing the thermally-assisted magnetic recording head 1 according to the present embodiment. The method of manufacturing the thermally-assisted magnetic recording head 1 includes the step of manufacturing the slider 10 and the step of fixing the light source unit 50 to the slider 10. Here, the method of manufacturing the slider 10 will be described briefly. The method of manufacturing the slider 10 includes the steps of: forming components of a plurality of sliders 10 other than the slider substrates 11 on a substrate that includes portions to become the slider substrates 11 of the plurality of sliders 10, thereby fabricating a substructure that includes a plurality of rows of pre-slider portions, the pre-slider portions being intended to become the sliders 10 later; and forming the plurality of sliders 10 by cutting the substructure to separate the plurality of pre-slider portions from each other. In the step of forming the plurality of sliders 10, the surfaces formed by the cutting are polished into the medium facing surfaces 11a and 12a.

The method of manufacturing the thermally-assisted magnetic recording head 1 (the method of manufacturing the slider 10) according to the present embodiment includes the steps of: forming the waveguide; forming the plasmon generator 34 after the formation of the wave guide; and forming the magnetic pole 35 after the formation of the plasmon generator 34. The step of forming the waveguide includes the steps of forming the clad layer 31; forming the core 32 on the clad layer 31; and forming the clad layer 33 to cover the clad layer 31 and the core 32.

The step of forming the clad layer 33, the step of forming the plasmon generator 34, and the step of forming the magnetic pole 35 will now be described in detail with reference to FIG. 14 to FIG. 21. FIG. 14 to FIG. 21 are cross-sectional views each showing a part of a stack of layers fabricated in the process of manufacturing the thermally-assisted magnetic recording head 1. FIG. 14 to FIG. 21 each show a cross section in the position where the medium facing surface 12a is to be formed.

Figure 14:
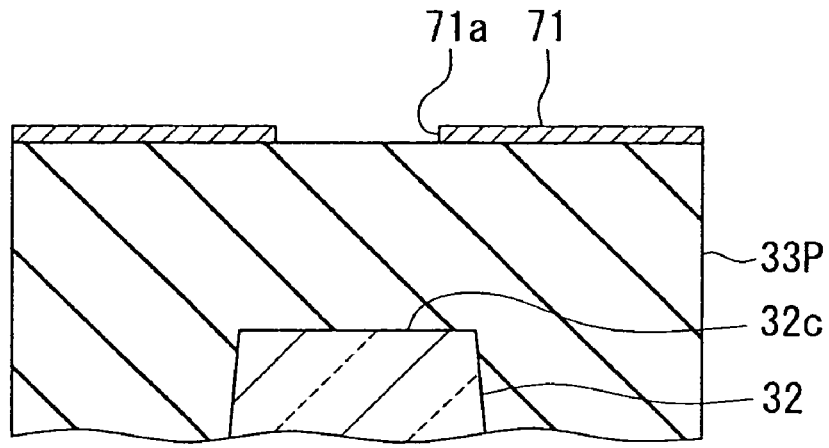
FIG. 14 is a cross-sectional view showing a step of a method of manufacturing the thermally-assisted magnetic recording head according to the first embodiment of the invention.
Figure 14:
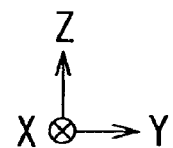

FIG. 14 shows a step of the method of manufacturing the thermally-assisted magnetic recording head 1. In this step, the core 32 of the waveguide is initially formed on the clad layer 31 and then a dielectric layer 33P is formed to cover the clad layer 31 and the core 32. The dielectric layer 33P is to undergo the formation of the groove 33b therein later to thereby become the clad layer 33. Next, an etching mask 71 made of, for example, metal, is formed on the dielectric layer 33P. The etching mask 71 has an opening 71a that has a shape corresponding to the planar shape of the plasmon generator 34 to be formed later.

Figure 15:
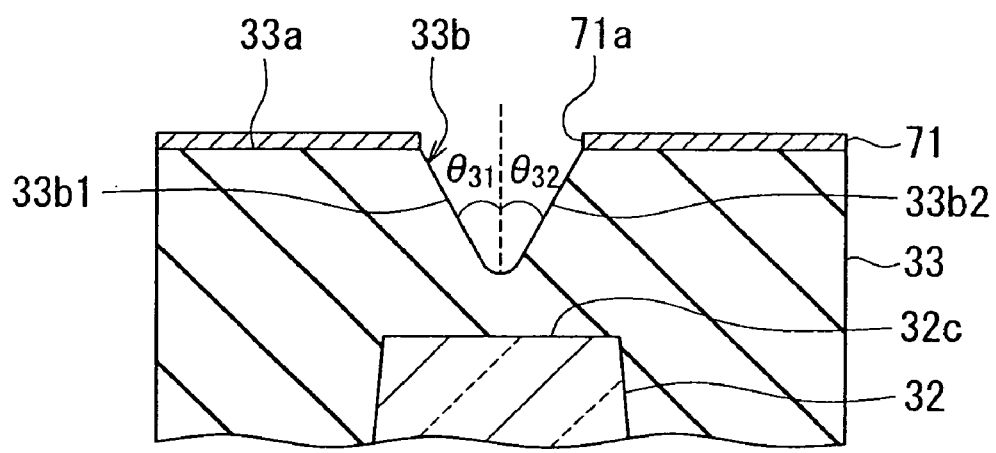
FIG. 15 is a cross-sectional view showing a step that follows the step of FIG. 14.
Figure 15:
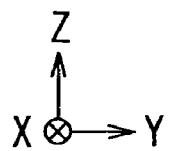
Figure 16:
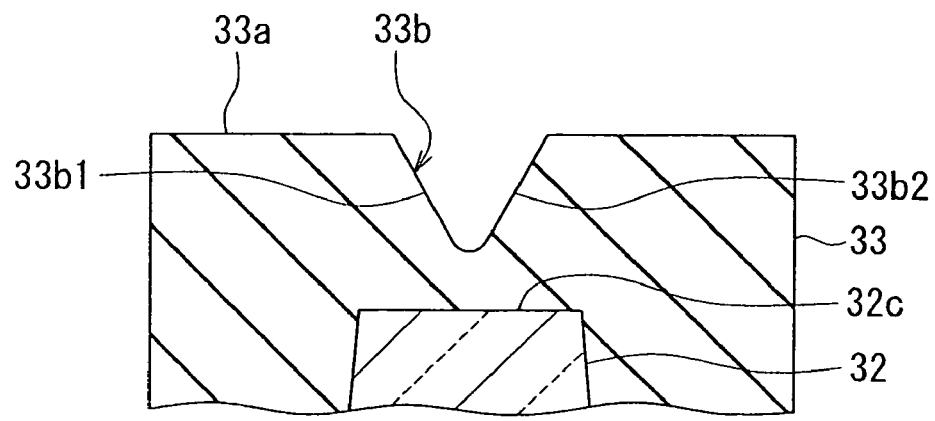
FIG. 16 is a cross-sectional view showing a step that follows the step of FIG. 15.

FIG. 15 shows the next step. In this step, the dielectric layer 33P is initially etched by, for example, reactive ion etching or ion milling, by using the etching mask 71. The groove 33b is thereby formed in the dielectric layer 33P. The groove 33b is formed so that its bottom surface faces the evanescent light generating surface 32c with a predetermined distance therebetween. As has been described with reference to FIG. 4, the groove 33b includes the V-shaped groove portion. The V-shaped groove portion has the first and second sidewalls 33b1 and 33b2. The etching depth (dimension in the Z direction) of the groove 33b in the position where the medium facing surface 12a is to be formed is 110 nm, for example. With the groove 33b formed therein, the dielectric layer 33P becomes the clad layer 33. Next, the etching mask 71 is removed. FIG. 16 shows the stack after the removal of the etching mask 71.

In FIG. 15, the angle that the first sidewall 33b1 forms with respect to the direction perpendicular to the top surface 33a of the clad layer 33 is represented by the symbol $\theta_{31}$, and the angle that the second sidewall 33b2 forms with respect to the direction perpendicular to the top surface 33a of the clad layer 33 is represented by the symbol $\theta_{32}$. The angle $\theta_{31}$ and the angle $\theta_{32}$ are equal. The angles $\theta_{31}$ and $\theta_{32}$ fall within the range of 15 to 60 degrees, for example.

Figure 17:
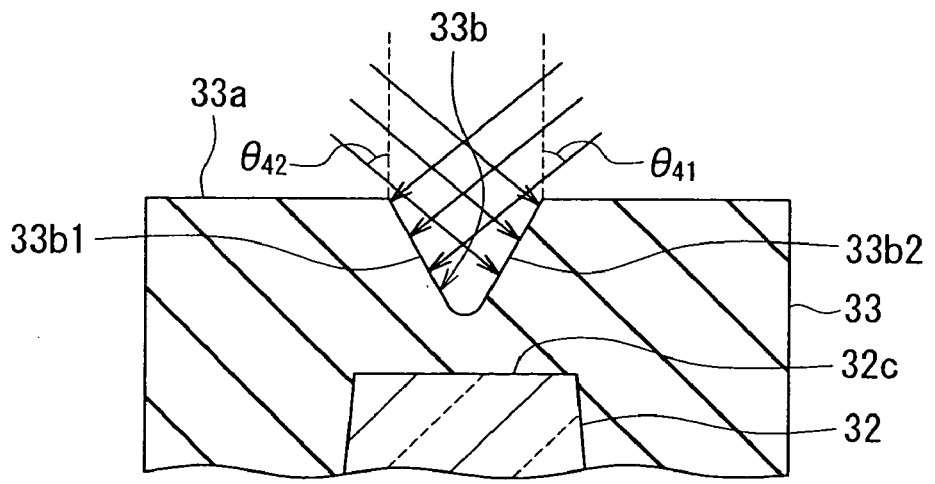
FIG. 17 is a cross-sectional view showing a step that follows the step of FIG. 16.
Figure 18:
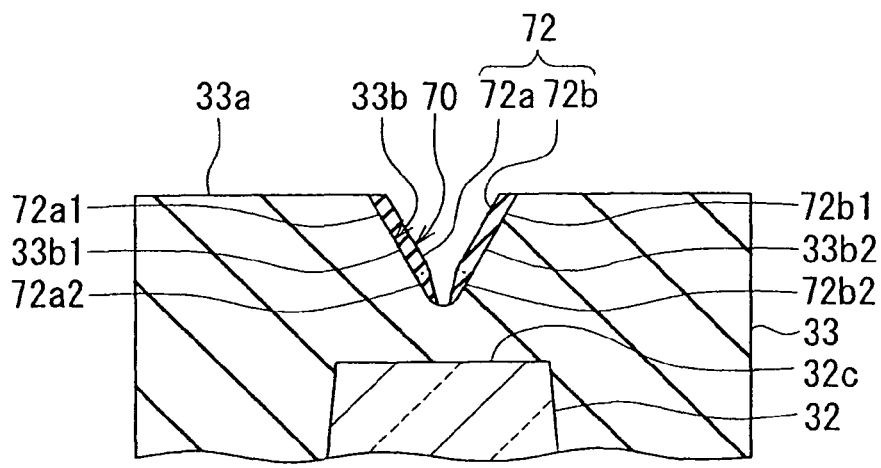
FIG. 18 is a cross-sectional view showing a step that follows the step of FIG. 17.

FIG. 17 shows the next step. In this step, the dielectric film 72 is formed in the groove 33b by ion beam sputtering, for example. The dielectric film 72 is formed at least on the first and second sidewalls 33b1 and 33b2 of the V-shaped groove portion of the groove 33b. The dielectric film 72 includes the first film portion 72a adhering to the first sidewall 33b1, and the second film portion 72b adhering to the second sidewall 33b2. FIG. 18 shows the stack after the formation of the dielectric film 72. In FIG. 18, the border between the upper part 72a1 and the lower part 72a2 and the border between the upper part 72b1 and the lower part 72b2 are shown by respective dotted lines. The groove 33b and the dielectric film 72 constitute the accommodating part 70 for accommodating the plasmon generator 34.

This step is performed under such a condition that in the first film portion 72a, the lower part 72a2 has a thickness smaller than that of the upper part 72a1 in the direction perpendicular to the first sidewall 33b1 and in the second film portion 72b, the lower part 72b2 has a thickness smaller than that of the upper part 72b1 in the direction perpendicular to the second sidewall 33b2, as shown in FIG. 18.

For example, when forming the dielectric film 72 by ion beam sputtering, the first film portion 72a and the second film portion 72b are alternately formed by changing the angle that the traveling direction of the center of the material particle flow for forming the dielectric film 72 forms with respect to the direction perpendicular to the top surface 33a of the clad layer 33. In FIG. 17, the arrows show the traveling direction of the center of the material particle flow. When forming the first film portion 72a, the traveling direction of the center of the material particle flow for forming the first film portion 72a is set to form an angle $\theta_{41}$ with respect to the direction perpendicular to the top surface 33a of the clad layer 33, the angle $\theta_{41}$ being greater than the angle $\theta_{32}$ (see FIG. 15) that the second sidewall 33b2 forms with respect to the direction perpendicular to the top surface 33a of the clad layer 33. When forming the second film portion 72b, the traveling direction of the center of the material particle flow for forming the second film portion 72b is set to form an angle $\theta_{42}$ with respect to the direction perpendicular to the top surface 33a of the clad layer 33, the angle $\theta_{42}$ being greater than the angle $\theta_{31}$ (see FIG. 15) that the first sidewall 33b1 forms with respect to the direction perpendicular to the top surface 33a of the clad layer 33. For example, when the angles $\theta_{31}$ and $\theta_{32}$ are 28 degrees and the etching depth of the groove 33b in the position where the medium facing surface 12a is to be formed is 110 nm, the angles $\theta_{41}$ and $\theta_{42}$ are set to 45 degrees. With the angles $\theta_{41}$ and $\theta_{42}$ greater than the angles $\theta_{31}$ and $\theta_{32}$, a smaller amount of material adheres to the first and second sidewalls 33b1 and 33b2 in the vicinity of the bottom of the groove 33b. As a result, the first film portion 72a and the second film portion 72b are formed into the above-mentioned shape.

The dielectric film 72 can also be formed by ordinary sputtering with low directivity. Even in such a case, the dielectric film 72 can be formed so that a smaller amount of material adheres to the first and second sidewalls 33b1 and 33b2 in the vicinity of the bottom of the groove 33b.

Figure 19:
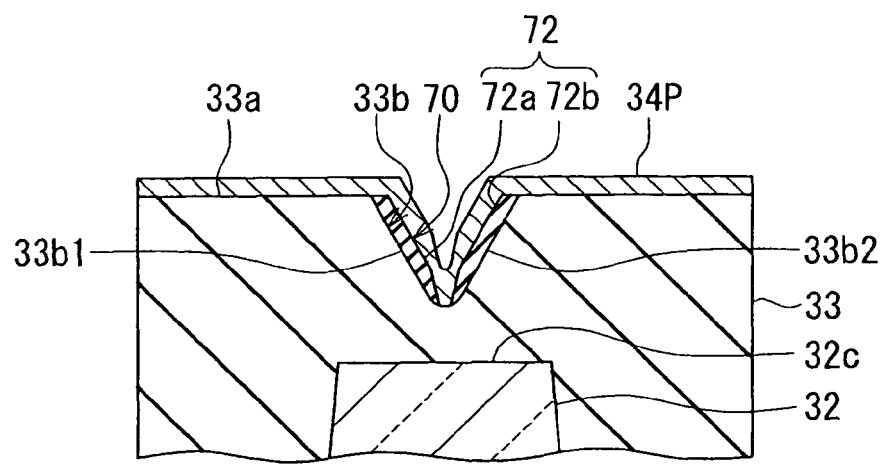
FIG. 19 is a cross-sectional view showing a step that follows the step of FIG. 18.

FIG. 19 shows the next step. In this step, a metal film 34P is formed by, for example, sputtering, so as to cover the entire top surface of the stack shown in FIG. 18. The metal film 34P is to become the plasmon generator 34 later.

Figure 20:
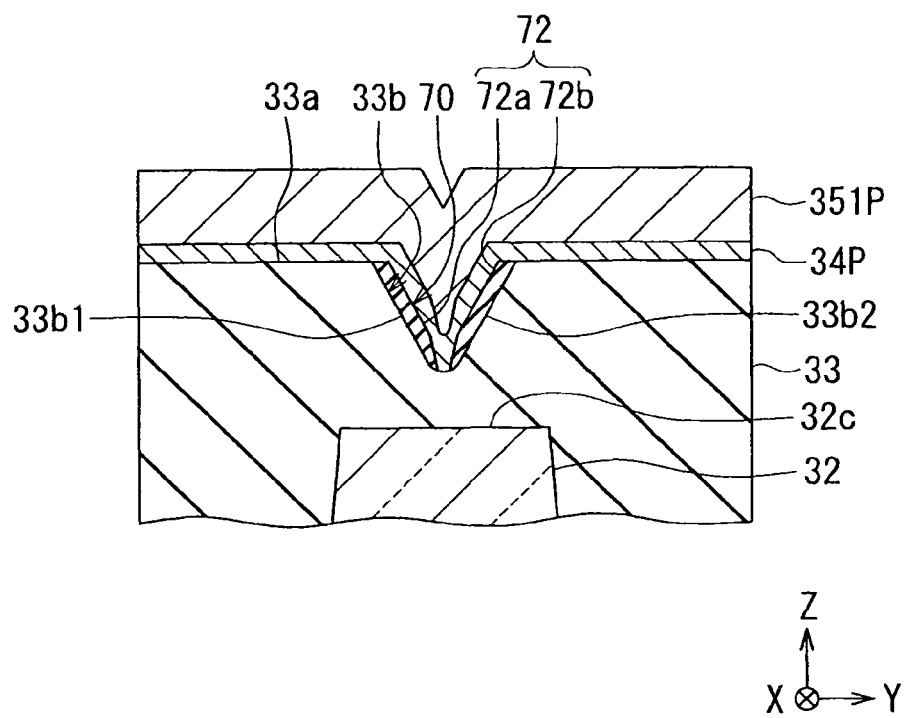
FIG. 20 is a cross-sectional view showing a step that follows the step of FIG. 19.

FIG. 20 shows the next step. In this step, a magnetic layer 351P is formed on the metal film 34P by plating, for example. The magnetic layer 351P is to become the first layer 351 of the magnetic pole 35 later. The magnetic layer 351P is formed into a thickness sufficient for at least filling the accommodating part 70.

Figure 21:
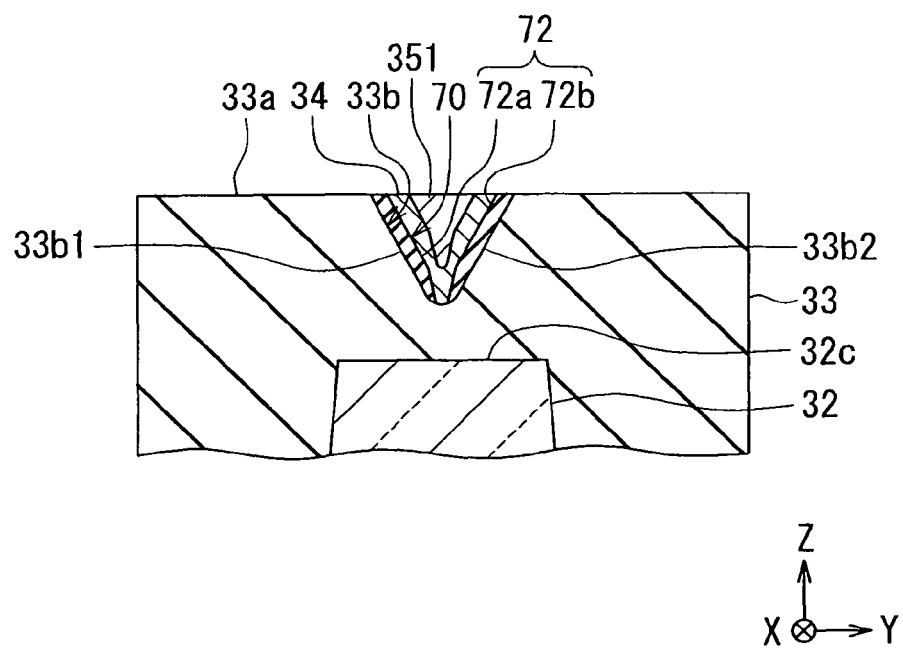
FIG. 21 is a cross-sectional view showing a step that follows the step of FIG. 20.

FIG. 21 shows the next step. In this step, the magnetic layer 351P and the metal film 34P are polished by, for example, chemical mechanical polishing, until the clad layer 33 is exposed. As a result, the remaining metal film 34P becomes the plasmon generator 34, and the remaining magnetic layer 351P becomes the first layer 351 of the magnetic pole 35. Next, although not shown, the second layer 352 is formed on the first layer 351 by plating, for example. This completes the magnetic pole 35.

When the foregoing substructure is completed, the substructure is cut near the positions where the medium facing surfaces 12a are to be formed, so that the plurality of pre-slider portions are separated from each other. Subsequently, the surfaces formed by the cutting are polished into the respective medium facing surfaces 12a.

The effects of the thermally-assisted magnetic recording head 1 according to the present embodiment will now be described. The plasmon generator 34 of the present embodiment has the outer surface including the plasmon exciting part 341, and has the near-field light generating part 34g located in the medium facing surface 12a. The plasmon exciting part 341 faces the evanescent light generating surface 32c of the core 32 with a predetermined distance therebetween. Surface plasmons are excited on the plasmon exciting part 341 through coupling with the evanescent light that occurs from the evanescent light generating surface 32c. The near-field light generating part 34g generates near-field light based on the surface plasmons excited on the plasmon exciting part 341.

According to the present embodiment, it is possible to transform the laser light that is propagated through the core 32 into near-field light with higher efficiency, as compared with the conventional technique of irradiating a plasmon antenna directly with laser light to produce near-field light from the plasmon antenna.

In the present embodiment, the plasmon exciting part 341 includes the flat surface part 341b. The flat surface part 341b includes the width changing portion 341b1. The width of the width changing portion 341b1 in the direction parallel to the medium facing surface 12a and the evanescent light generating surface 32c (Y direction) decreases with decreasing distance to the medium facing surface 12a. In the width changing portion 341b1, as has been described with reference to FIG. 6, the propagating plasmons increase in electric field intensity. According to the present embodiment, it is therefore possible to efficiently enhance the intensity of the near-field light occurring from the plasmon generator 34.

From the foregoing, according to the present embodiment, it is possible to efficiently use the laser light that is propagated through the core 32, and to produce intense near-field light from the plasmon generator 34. The present embodiment also makes it possible to prevent a part of the medium facing surface 12a from protruding due to transformation of the energy of the laser light into thermal energy in the thermally-assisted magnetic recording head.

In the present embodiment, the outer surface of the plasmon generator 34 includes the first inclined surface 342, the second inclined surface 343, and the front end face 344, in addition to the plasmon exciting part 341. The first inclined surface 342 and the second inclined surface 343 are connected to the plasmon exciting part 341, and increase in distance from each other with increasing distance from the plasmon exciting part 341. The front end face 344 is located in the medium facing surface 12a and connected to the first and second inclined surfaces 342 and 343. The first inclined surface 342 includes the inclined surface 342a that is included in the V-shaped portion 34A. The second inclined surface 343 includes the inclined surface 343a that is included in the V-shaped portion 34A. The inclined surface 342a includes the upper part 342a1 and the lower part 342a2 that are continuous with each other. The inclined surface 343a includes the upper part 343a1 and the lower part 343a2 that are continuous with each other.

The front end face 344 has the first and second portions 344a and 344b that are connected to each other into a V-shape, and the bottom end 344c that is closer to the evanescent light generating surface 32c. The bottom end 344c forms the near-field light generating part 34g. The first portion 344a includes the first side 345a lying at the end of the first inclined surface 342 (inclined surface 342a). The second portion 344b includes the second side 345b lying at the end of the second inclined surface 343 (inclined surface 343a). The first side 345a includes the upper part 345a1 and the lower part 345a2 that are continuous with each other. The second side 345b includes the upper part 345b1 and the lower part 345b2 that are continuous with each other.

The upper parts 342a1 and 343a1 of the inclined surfaces 342a and 343a and the upper parts 345a1 and 345b1 of the sides 345a and 345b each have an inclination angle of $\theta_1$. The lower parts 342a2 and 343a2 of the inclined surfaces 342a and 343a and the lower parts 345a2 and 345b2 of the sides 345a and 345b each have an inclination angle of $\theta_2$. The angle $2\theta_2$ formed between the lower part 345a2 and the lower part 345b2 is smaller than the angle $2\theta_1$ formed between the upper part 345a1 and the upper part 345b1.

According to the present embodiment, between the two types of angles $\theta_1$ and $\theta_2$, the angle $\theta_1$ in particular is set to an appropriate value. This makes it possible to match the wave number of the surface plasmons to be excited on the plasmon generator 34 with the wave number of the evanescent light which depends on the wavelength of the laser light to be propagated through the core 32. It is thereby possible to increase the intensity of the surface plasmons to be excited on the plasmon generator 34. According to the present embodiment, reducing the angle $2\theta_2$ between the lower part 345a2 of the first side 345a and the lower part 345b2 of the second side 345b allows forming the front end face 344 of the plasmon generator 34 into a more sharply pointed shape in the vicinity of the bottom end 344c which constitutes the near-field light generating part 34g. This makes it possible to reduce the spot diameter of the near-field light. According to the present embodiment, it is thus possible to reduce the spot diameter of the near-field light while matching the wave number of the evanescent light with the wave number of the surface plasmons to be excited on the plasmon generator 34. Consequently, according to the present embodiment, it is possible to use the light propagated through the core 32 of the waveguide with high efficiency and to produce near-field light with a small spot diameter from the plasmon generator 34.

In the present embodiment, the groove 33b of the clad layer 33 and the dielectric film 72 constitute the accommodating part 70 for accommodating the plasmon generator 34. The groove 33b includes the V-shaped groove portion. The V-shaped groove portion includes the first and second sidewalls 33b1 and 33b2 that increase in distance from each other with increasing distance from the top surface 33a of the clad layer 33. The dielectric film 72 includes the first film portion 72a adhering to the first sidewall 33b1, and the second film portion 72b adhering to the second sidewall 33b2. The first film portion 72a includes the upper part 72a1 and the lower part 72a2 that are continuous with each other. The second film portion 72b includes the upper part 72b1 and the lower part 72b2 that are continuous with each other. In the first film portion 72a, the lower part 72a2 has a thickness smaller than that of the upper part 72a1 in the direction perpendicular to the first sidewall 33b1. In the second film portion 72b, the lower part 72b2 has a thickness smaller than that of the upper part 72b1 in the direction perpendicular to the second sidewall 33b2. Forming the plasmon generator 34 to be accommodated in such an accommodating part 70 makes it easy to provide the plasmon generator 34 with the shape described above.

A description will now be given of the results of a simulation demonstrating that the plasmon generator 34 having the above-described shape allows the efficient use of the laser light propagated through the core 32 and allows generation of near-field light with a small spot diameter from the plasmon generator 34. Initially, a plurality of models of the thermally-assisted magnetic recording head that were used in the simulation will be described. The plurality of models that were used in the simulation include a plurality of models of first type in which the lower parts 345a2 and 345b2 of the sides 345a and 345b have an inclination angle $\theta_2$ of 10 degrees, a plurality of models of second type with $\theta_2$ of 15 degrees, and a plurality of models of third type with $\theta_2$ of 20 degrees.

In all the models, tantalum oxide was selected as the material of the core 32, Au was selected as the material of the plasmon generator 34, alumina was selected as the material of the clad layers 31 and 33 and the dielectric film 72, and FeCo alloy was selected as the material of the magnetic pole 35. The width $W_{WG}$ of the evanescent light generating surface 32c of the core 32 in the vicinity of the plasmon generator 34 and the thickness $T_{WG}$ of the core 32 were both set to 0.4 μm. Each of the two sides 32b3 and 32b4 of the end face 32b of the core 32 was set to form an angle $\theta_{WG}$ of 5 degrees with respect to the direction perpendicular to the top side 32b1.

In all the models, the distance $T_{BF}$ between the plasmon exciting part 341 and the evanescent light generating surface 32c was set to 50 nm. The distance D between the bottom end 344c of the front end face 344 of the plasmon generator 34 and the tip 35c of the end face 35a1 of the first layer 351 of the magnetic pole 35 was set to 35 nm. The dimension $T_{PG}$ of the plasmon generator 34 in the Z direction at the medium facing surface 12a was set to 110 nm. The dimension $W_{PGL}$ of the third portion 34C of the plasmon generator 34 in the track width direction TW (Y direction) was set to 400 nm. The length $H_{PG}$ of the plasmon generator 34 in the X direction was set to 1.5 μm. The length $H_{PGA}$ of the V-shaped portion 34A of the plasmon generator 34 in the X direction was set to 0.1 μm.

In all the models, the inclination angle $\theta_1$ of each of the upper parts 345a1 and 345b1 of the sides 345a and 345b was set to 28 degrees. Each of the inclined surfaces 342c and 343c of the third portion 34C was set to form an angle of 33 degrees with respect to the direction perpendicular to the evanescent light generating surface 32c.

The distance $T_{PG2}$ shown in FIG. 5 was set to different values between the first to third types within the range of 0 nm to 40 nm. It should be noted that $T_{PG2}$=0 nm means the absence of the lower parts 342a2 and 343a2 of the inclined surfaces 342a and 343a and the lower parts 345a2 and 345b2 of the sides 345a and 345b.

In the simulation, a Gaussian beam with a wavelength of 800 nm was selected as the laser light to be propagated through the core 32. The light density distribution of the near-field light at the surface of a magnetic recording medium 201 located 6 nm away from the medium facing surface 12a was then determined by using a three-dimensional finite-difference time-domain method (FDTD method). From the light density distribution, the spot diameter of the near-field light (hereinafter, referred to as a light spot diameter) and the maximum light density were determined. The light spot diameter was defined as the full width at half maximum in the light density distribution.

Figure 22:
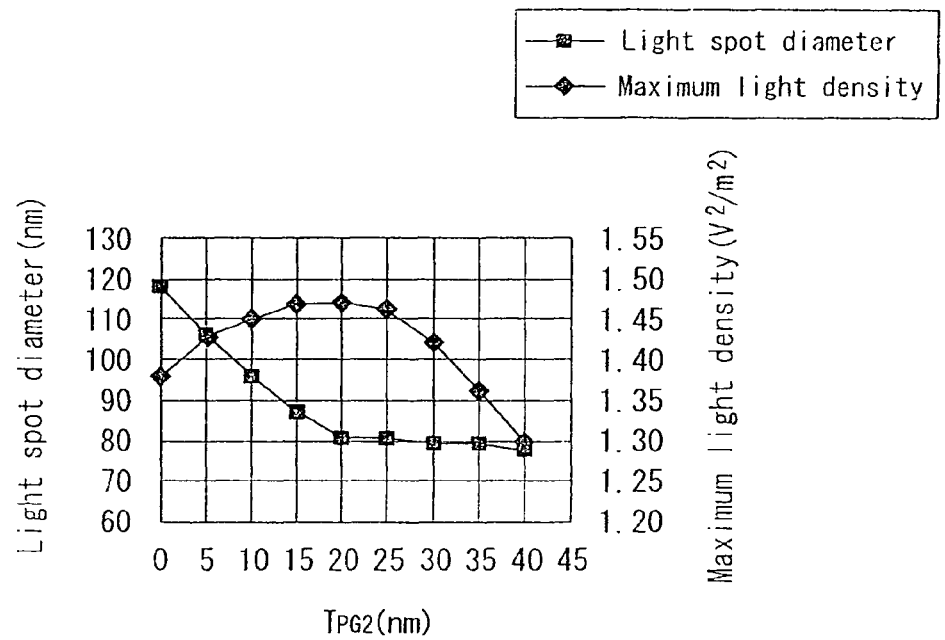
FIG. 22 is a characteristic chart showing the light spot diameters and the maximum light densities of a plurality of models of first type.
Figure 23:
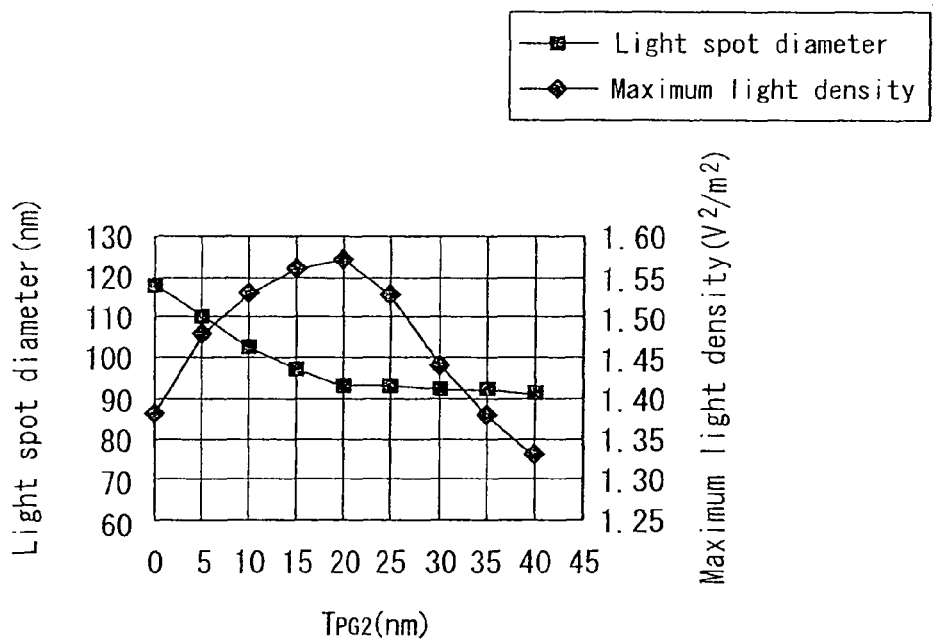
FIG. 23 is a characteristic chart showing the light spot diameters and the maximum light densities of a plurality of models of second type.
Figure 24:
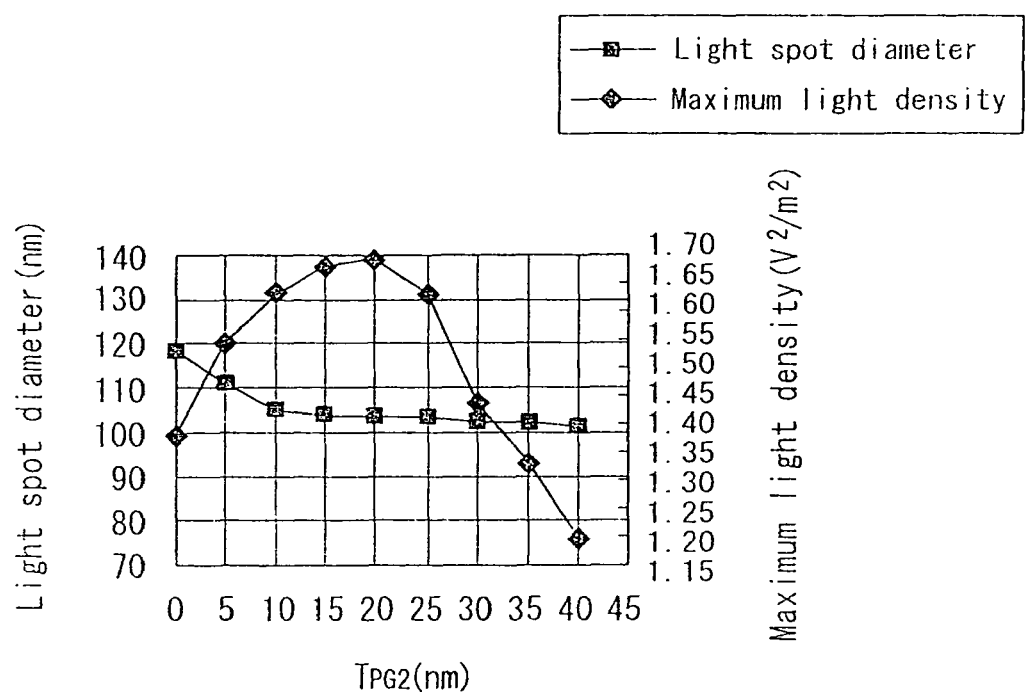
FIG. 24 is a characteristic chart showing the light spot diameters and the maximum light densities of a plurality of models of third type.

Table 1 and FIG. 22 show the result of the simulation using the plurality of models of first type. Table 2 and FIG. 23 show the result of the simulation using the plurality of models of second type. Table 3 and FIG. 24 show the result of the simulation using the plurality of models of third type. In FIG. 22 to FIG. 24, the horizontal axis indicates the distance $T_{PG2}$ shown in FIG. 5, the vertical axis on the left indicates the light spot diameter, and the vertical axis on the right indicates the maximum light density.

TABLE 1

| $T_{PG2}$ (nm) | Maximum light density (V$^2$/m$^2$) | Light spot diameter (nm) |
|---|---|---|
| 0 | 1.38 | 118 |
| 5 | 1.43 | 106 |
| 10 | 1.45 | 96 |
| 15 | 1.47 | 87 |
| 20 | 1.47 | 81 |
| 25 | 1.46 | 81 |
| 30 | 1.42 | 79 |
| 35 | 1.36 | 79 |
| 40 | 1.30 | 78 |

TABLE 2

| $T_{PG2}$ (nm) | Maximum light density (V$^2$/m$^2$) | Light spot diameter (nm) |
|---|---|---|
| 0 | 1.38 | 118 |
| 5 | 1.48 | 110 |
| 10 | 1.53 | 103 |
| 15 | 1.56 | 97 |
| 20 | 1.57 | 93 |
| 25 | 1.53 | 93 |
| 30 | 1.44 | 92 |
| 35 | 1.38 | 92 |
| 40 | 1.33 | 91 |

TABLE 3

| $T_{PG2}$ (nm) | Maximum light density (V$^2$/m$^2$) | Light spot diameter (nm) |
|---|---|---|
| 0 | 1.38 | 118 |
| 5 | 1.55 | 111 |
| 10 | 1.63 | 105 |
| 15 | 1.68 | 104 |
| 20 | 1.70 | 103 |
| 25 | 1.63 | 103 |
| 30 | 1.44 | 102 |
| 35 | 1.33 | 102 |
| 40 | 1.20 | 102 |

From Table 1 to Table 3 and FIG. 22 to FIG. 24, it can be seen that the light spot diameter decreases with increasing $T_{PG2}$. It is also shown that the maximum light density peaks at around $T_{PG2}$=20 nm, and falls off away from $T_{PG2}$=20 nm. It is preferred that the light spot diameter be as small as possible, and that the maximum light density be as high as possible. Based on the results shown in Table 1 to Table 3 and FIG. 22 to FIG. 24, the range of 105 nm and smaller is selected as the preferred range of the light spot diameter so as to exclude relatively large light spot diameters. The range of 1.45 V$^2$/m$^2$ and higher is selected as the preferred range of the maximum light density so as to exclude relatively low maximum light densities. The light spot diameter and the maximum light density fall within the respective preferred ranges if $T_{PG2}$ is in the range of 10 nm to 25 nm. That is, when $T_{PG2}$ is in the range of 10 nm to 25 nm, the light spot diameter can be made relatively smaller and the maximum light density relatively higher as compared with the case where $T_{PG2}$ is out of the range. Consequently, $T_{PG2}$ preferably falls within the range of 10 nm to 25 nm. When $T_{PG2}$ is in the range of 10 nm to 25 nm, the light spot diameter is smaller and the maximum light density is higher than when $T_{PG2}$=0 nm. It can thus be seen that the present embodiment makes it possible to reduce the light spot diameter and increase the maximum light density as well.

As can be seen from the results of the simulation described above, it is possible according to the present embodiment to efficiently use the laser light that is propagated through the core 32 and to produce near-field light with a small spot diameter from the plasmon generator 34.

The other effects of the present embodiment will now be described. Initially, a description will be given of the effect resulting from the configuration that the flat surface part 341b of the plasmon exciting part 341 of the plasmon generator 34 includes the constant width portion 341b2. Suppose that the flat surface part 341b does not include the constant width portion 341b2, and the width changing portion 341b1 extends up to the end of the flat surface part 341b opposite from the medium facing surface 12a. In such a case, the maximum width of the flat surface part 341b is greater as compared with the case where the flat surface part 341b includes the constant width portion 341b2. Then, the width $W_{WG}$ of the evanescent light generating surface 32c of the core 32 in the vicinity of the plasmon generator 34 needs to be increased to the maximum width of the flat surface part 341b. Consequently, at least a part of the core 32 in the vicinity of the plasmon generator 34 is likely to enter a multi mode that is capable of propagating a plurality of modes (propagation modes) of light. In this case, the mode that contributes to the excitation of surface plasmons on the flat surface part 341b weakens to decrease the use efficiency of the light that is propagated through the core 32. In contrast, according to the present embodiment, the flat surface part 341b includes the constant width portion 341b2, and it is therefore possible to make the width $W_{WG}$ of the evanescent light generating surface 32c of the core 32 in the vicinity of the plasmon generator 34 smaller than that in the case where the flat surface part 341b does not include the constant width portion 341b2. According to the present embodiment, it is therefore possible to bring at least a part of the core 32 in the vicinity of the plasmon generator 34 into a single mode that is capable of propagating only a single mode of light. Consequently, it is possible to improve the use efficiency of the laser light that is propagated through the core 32.

Next, a description will be given of the effect resulting from the configuration that the plasmon generator 34 has the V-shaped portion 34A and the propagative edge 341a. As described previously, the medium facing surface 12a is formed by polishing a surface that is formed by cutting the substructure. In such a case, the position of the medium facing surface 12a may slightly vary. Suppose that the plasmon generator 34 is designed not to have the V-shaped portion 34A or the propagative edge 341a so that the ends of the second portion 34B and the width changing portion 341b1 are located in the medium facing surface 12a. If so, variations in the position of the medium facing surface 12a change the shape of the front end face 344 of the plasmon generator 34, or the shape of the bottom end 344c in particular. As a result, the near-field light occurring from the plasmon generator 34 can vary in characteristic. In contrast, according to the present embodiment, the plasmon generator 34 has the V-shaped portion 34A and the propagative edge 341a. This makes it possible that, even if the position of the medium facing surface 12a somewhat varies, the front end face 344 of the plasmon generator 34 remains unchanged in shape. According to the present embodiment, it is therefore possible to prevent the characteristics of the near-field light generated by the plasmon generator 34 from being changed due to variations in the position of the medium facing surface 12a.

Next, a description will be given of the effect resulting from the configuration that the magnetic pole 35 is disposed such that the plasmon generator 34 is interposed between the magnetic pole 35 and the core 32. With such a configuration, according to the present embodiment, the end face of the magnetic pole 35 for generating the write magnetic field (the end face 35a1 of the first layer 351) and the near-field light generating part 34g of the plasmon generator 34 for generating the near-field light can be put close to each other in the medium facing surface 12a. This makes it possible to implement an advantageous configuration for thermally-assisted magnetic recording. Moreover, according to the present embodiment, since the plasmon generator 34 made of a nonmagnetic metal is interposed between the core 32 and the magnetic pole 35, it is possible to prevent the laser light propagated through the core 32 from being absorbed by the magnetic pole 35. This can improve the use efficiency of the laser light propagated through the core 32.

In the present embodiment, the magnetic pole 35 is in contact with the plasmon generator 34. The magnetic pole 35 is also in contact with the top yoke layer 43 of high volume via the coupling layer 36. Consequently, according to the present embodiment, the heat occurring from the plasmon generator 34 can be dissipated through the magnetic pole 35, the coupling layer 36, and the top yoke layer 43. This can suppress an excessive rise in temperature of the plasmon generator 34, so that the front end face 344 of the plasmon generator 34 will not protrude from the medium facing surface 12a, nor will the plasmon generator 34 drop in use efficiency of the light. Moreover, according to the present embodiment, the plasmon generator 34 made of a metal is in contact with the magnetic pole 35 made of a magnetic metal material. The plasmon generator 34 is thus not electrically isolated. According to the present embodiment, it is therefore possible to avoid the occurrence of electrical static discharge (ESD) in the plasmon generator 34.

In the present embodiment, the front end face 344 of the plasmon generator 34 has the two portions 344a and 344b that are connected to each other into a V-shape. The end face 35a of the magnetic pole 35 located in the medium facing surface 12a includes a generally triangular portion interposed between the two portions 344a and 344b of the front end face 344, that is, the end face 35a1 of the first layer 351. The end face 35a1 has the tip 35c located at its bottom end. In the end face 35a of the magnetic pole 35, the tip 35c is closest to the bottom shield layer 29. Magnetic fluxes therefore concentrate at the vicinity of the tip 35c of the end face 35a of the magnetic pole 35, so that a high write magnetic field occurs from the vicinity of the tip 35c. Consequently, according to the present embodiment, the position where a high write magnetic field occurs in the end face 35a of the magnetic pole 35 can be brought closer to the near-field light generating part 34g of the plasmon generator 34 which generates near-field light. According to the present embodiment, it is thus possible to put the position of occurrence of the write magnetic field and the position of occurrence of the near-field light close to each other while preventing the laser light propagated through the core 32 from being absorbed by the magnetic pole 35.

The plasmon generator 34 has the V-shaped portion 34A which is V-shaped in cross section parallel to the medium facing surface 12a. The magnetic pole 35 includes a generally triangular-prism-shaped portion accommodated in the V-shaped portion 34A, that is, the first portion 351A of the first layer 351. The width of the first portion 351A in the direction parallel to the medium facing surface 12a and the evanescent light generating surface 32c (Y direction) does not change according to the distance from the medium facing surface 12a. According to the present embodiment, it is therefore possible to keep the shape of the end face 35a1 of the first layer 351 constant even if the position of the medium facing surface 12a somewhat varies. Consequently, according to the present embodiment, it is possible to suppress a change in the write characteristics due to variations in the position of the medium facing surface 12a.

The plasmon generator 34 further has the second portion 34B. The second portion 34B has the bottom part 34B1 and the two sidewall parts 34B2 and 34B3. The width of the bottom part 34B1 in the direction parallel to the medium facing surface 12a and the evanescent light generating surface 32c (Y direction) decreases with decreasing distance to the medium facing surface 12a. The distance between the two sidewall parts 34B2 and 34B3 in the direction parallel to the medium facing surface 12a and the evanescent light generating surface 32c (Y direction) increases with increasing distance from the evanescent light generating surface 32c, and decreases with decreasing distance to the medium facing surface 12a. The magnetic pole 35 includes the second portion 351B that is interposed between the two sidewall parts 34B2 and 34B3 and in contact with the bottom part 34B1 and the two sidewall parts 34B2 and 34B3. The width of the second portion 351B in the direction parallel to the medium facing surface 12a and the evanescent light generating surface 32c (Y direction) decreases with decreasing distance to the medium facing surface 12a. Consequently, according to the present embodiment, magnetic fluxes passing through the magnetic pole 35 can be concentrated as they approach the first portion 351A of the first layer 351 of the magnetic pole 35. This makes it possible to produce a high write magnetic field from the end face 35a1.

Second Embodiment

Figure 25:
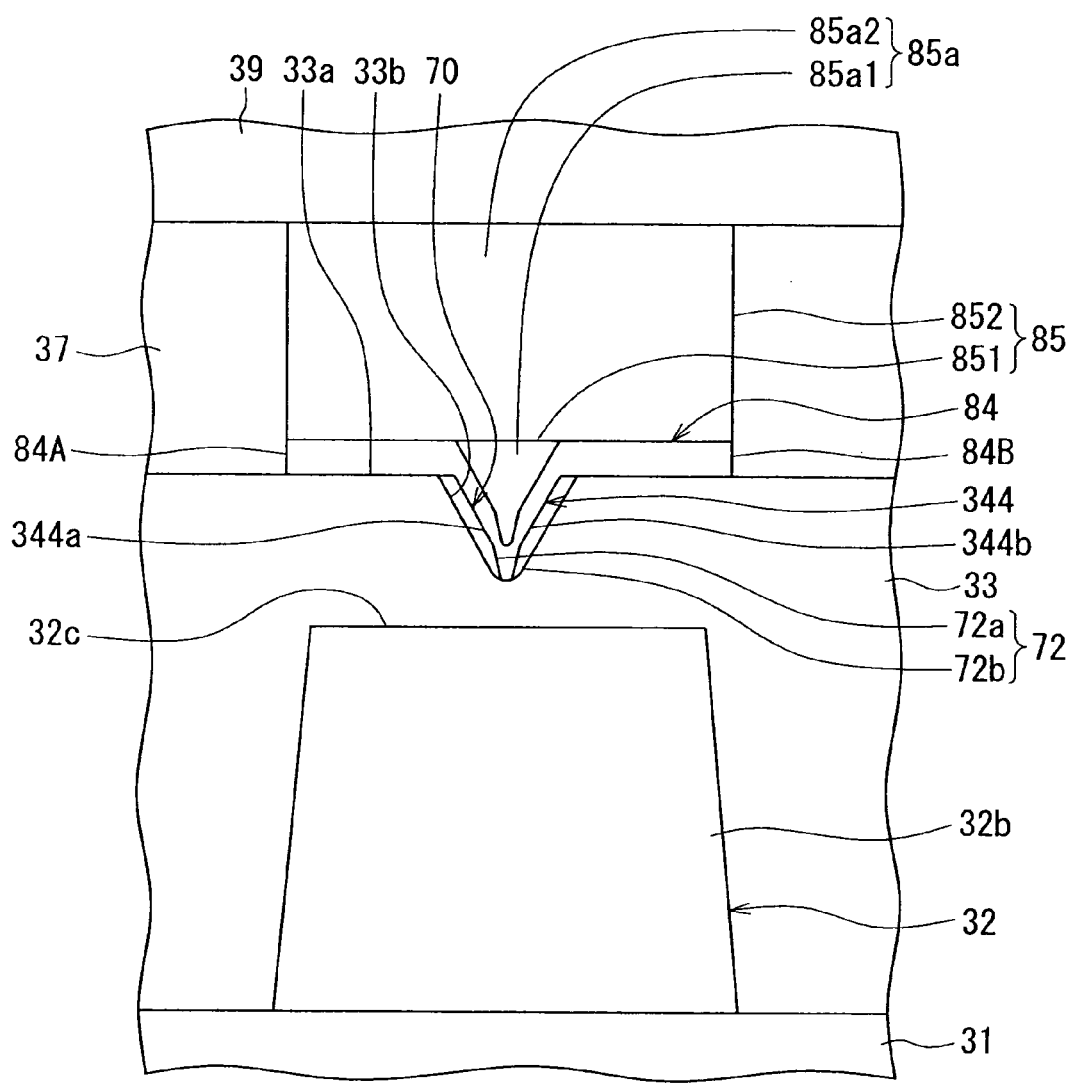
FIG. 25 is a front view showing a part of the medium facing surface of a head unit of a thermally-assisted magnetic recording head according to a second embodiment of the invention.

A second embodiment of the invention will now be described with reference to FIG. 25. FIG. 25 is a front view showing a part of the medium facing surface of the head unit of the thermally-assisted magnetic recording head according to the present embodiment. The thermally-assisted magnetic recording head according to the present embodiment has a plasmon generator 84 instead of the plasmon generator 34 of the first embodiment. Although not shown, the plasmon generator 84 has a V-shaped portion, a second portion, and a third portion, as does the plasmon generator 34 of the first embodiment. The outer surface of the plasmon generator 84 includes the front end face 344, as does the plasmon generator 34 of the first embodiment.

The thermally-assisted magnetic recording head according to the present embodiment has a magnetic pole 85 instead of the magnetic pole 35 of the first embodiment. The magnetic pole 85 includes a first layer 851, and a second layer 852 on the first layer 851. The V-shaped portion, the second portion, and the third portion of the plasmon generator 84 form inside a space for accommodating the first layer 851 of the magnetic pole 85. Although not shown, the first layer 851 includes a first portion, a second portion, and a third portion, as does the first layer 351 of the first embodiment. The second layer 852 is greater than the first layer 851 in width in the direction parallel to the medium facing surface 12a and the evanescent light generating surface 32c (Y direction).

The magnetic pole 85 has an end face 85a located in the medium facing surface 12a. The end face 85a includes an end face 85a1 of the first layer 851 located in the medium facing surface 12a and an end face 85a2 of the second layer 852 located in the medium facing surface 12a. The end face 85a1 is generally triangle-shaped and is interposed between the two portions 344a and 344b of the front end face 344 of the plasmon generator 84.

The plasmon generator 84 further has two extended portions 84A and 84B that spread out from the top ends of the V-shaped portion, the second portion and the third portion of the plasmon generator 84 in the direction parallel to the medium facing surface 12a and the evanescent light generating surface 32c (Y direction). As seen from above, the outer edges of the extended portions 84A and 84B coincide with or lie close to the outer edges of the second layer 852 of the magnetic pole 85. The bottom surfaces of the extended portions 84A and 84B are in contact with the top surface 33a of the clad layer 33. The top surfaces of the extended portions 84A and 84B are in contact with the bottom surface of the second layer 852.

The remainder of configuration, function and effects of the present embodiment are similar to those of the first embodiment.

Third Embodiment

Figure 26:
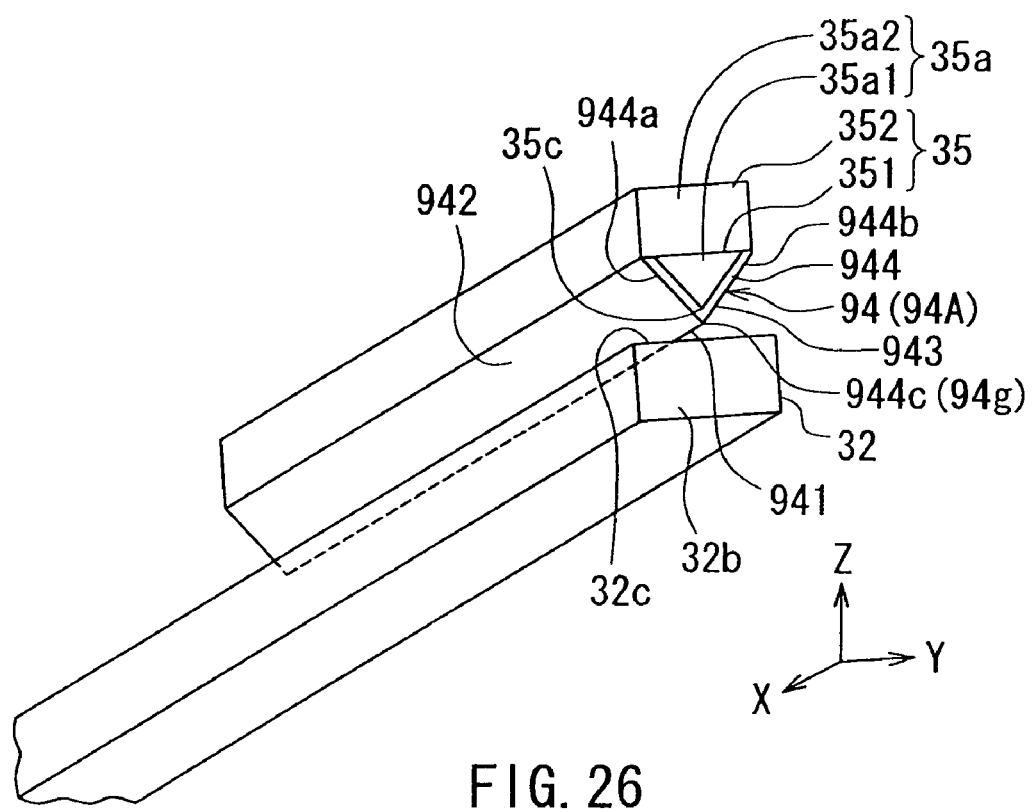
FIG. 26 is a perspective view showing a waveguide's core, a plasmon generator, and a magnetic pole of a thermally-assisted magnetic recording head according to a third embodiment of the invention.

A third embodiment of the invention will now be described with reference to FIG. 26. FIG. 26 is a perspective view showing the core of the waveguide, the plasmon generator, and the magnetic pole of the thermally-assisted magnetic recording head according to the present embodiment. The thermally-assisted magnetic recording head according to the present embodiment has a plasmon generator 94 instead of the plasmon generator 34 of the first embodiment. The plasmon generator 94 has a V-shaped portion 94A having an end face located in the medium facing surface 12a. The V-shaped portion 94A extends in the direction perpendicular to the medium facing surface 12a (X direction). In the present embodiment, in particular, the entire plasmon generator 94 is composed of the V-shaped portion 94A. In the cross section parallel to the medium facing surface 12a, the V-shaped portion 94A has the same shape as that of the V-shaped portion 34A of the plasmon generator 34 of the first embodiment.

The plasmon generator 94 has a near-field light generating part 94g located in the medium facing surface 12a. The outer surface of the plasmon generator 94 includes a propagative edge 941, a first inclined surface 942, a second inclined surface 943, and a front end face 944. The propagative edge 941 functions as a plasmon exciting part that faces the evanescent light generating surface 32c with a predetermined distance therebetween. The propagative edge 941 connects respective ends of the inclined surfaces 942 and 943 to each other, the ends being closer to the evanescent light generating surface 32c. The near-field light generating part 94g lies at an end of the propagative edge 941. The first and second inclined surfaces 942 and 943 increase in distance from each other with increasing distance from the propagative edge 941.

The front end face 944 has two portions 944a and 944b that are connected to each other into a V-shape. The front end face 944 further has a bottom end 944c that is closer to the evanescent light generating surface 32c. The bottom end 944c forms the near-field light generating part 94g. The front end face 944 has the same shape as that of the front end face 344 of the plasmon generator 34 of the first embodiment.

The magnetic pole 35 of the present embodiment includes a first layer 351, and a second layer 352 on the first layer 351. The first layer 351 is generally triangular-prism-shaped. The first layer 351 is accommodated in the V-shaped portion 94A and is in contact with the V-shaped portion 94A. The magnetic pole 35 has an end face 35a located in the medium facing surface 12a. The end face 35a includes an end face 35a1 of the first layer 351 located in the medium facing surface 12a and an end face 35a2 of the second layer 352 located in the medium facing surface 12a. The end face 35a1 is generally triangle-shaped and is interposed between the two portions 944a and 944b of the front end face 944 of the plasmon generator 94. The end face 35a1 has a tip 35c located at its bottom end. The second layer 352 has a bottom surface that is in contact with the top surface of the first layer 351 and the top end surface of the V-shaped portion 94A of the plasmon generator 94.

The remainder of configurations of the thermally-assisted magnetic recording head, the head gimbal assembly, and the magnetic recording device according to the present embodiment are the same as in the first embodiment. The function and effects of the thermally-assisted magnetic recording head according to the present embodiment are the same as in the first embodiment except the function and effects resulting from the second portion 34B and the third portion 34C of the plasmon generator 34 of the first embodiment the second portion 351B and the third portion 351C of the first layer 351 of the magnetic pole 35 of the first embodiment.

The present invention is not limited to the foregoing embodiments, and various modifications may be made thereto. For example, the plasmon generator of the present invention may be configured such that the V-shaped portion 34A is omitted from the plasmon generator 34 of the first embodiment. In such a case, an end of the second portion 34B is located in the medium facing surface 12a. The first layer 351 of the magnetic pole 35 in this case does not have the first portion 351A, so that an end of the second portion 351B is located in the medium facing surface 12a. Even in such a case, according to the invention, the front end face of the plasmon generator shall have the same shape as that of the front end face 344 of the plasmon generator 34 of the first embodiment.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:

a medium facing surface that faces a magnetic recording medium;

a magnetic pole that has an end face located in the medium facing surface and produces a write magnetic field for writing data on the magnetic recording medium;

a waveguide including a core and a clad, the core propagating light; and a plasmon generator, wherein:

the core has an evanescent light generating surface that generates evanescent light based on the light propagated through the core;

the plasmon generator has an outer surface including a plasmon exciting part, and has a near-field light generating part lying at an end of the plasmon exciting part and located in the medium facing surface, the plasmon exciting part facing the evanescent light generating surface with a predetermined distance therebetween, the plasmon generator being located above the evanescent light generating surface;

a surface plasmon is excited on the plasmon exciting part through coupling with the evanescent light generated from the evanescent light generating surface;

the near-field light generating part generates near-field light based on the surface plasmon excited on the plasmon exciting part;

the outer surface of the plasmon generator further includes first and second inclined surfaces that are each connected to the plasmon exciting part, and a front end face that is located in the medium facing surface and connected to the first and second inclined surfaces, the first and second inclined surfaces increasing in distance from each other with increasing distance from the plasmon exciting part;

the front end face has first and second portions that are connected to each other into a V-shape, and the end face of the magnetic pole has a portion interposed between the first and second portions of the front end face;

the first portion includes a first side that lies at an end of the first inclined surface;

the second portion includes a second side that lies at an end of the second inclined surface;

each of the first side and the second side includes an upper part and a lower part that are continuous with each other; and an angle formed between the lower part of the first side and the lower part of the second side is smaller than that formed between the upper part of the first side and the upper part of the second side.

2. The thermally-assisted magnetic recording head according to claim 1, wherein:

the front end face has a bottom end that is closer to the evanescent light generating surface; and a distance between the bottom end and a virtual straight line that passes through a border between the upper and lower parts of the first side and a border between the upper and lower parts of the second side falls within a range of 10 to 25 nm.

3. The thermally-assisted magnetic recording head according to claim 1, wherein:

the plasmon exciting part includes a propagative edge that connects respective ends of the first and second inclined surfaces to each other, the respective ends being closer to the evanescent light generating surface; and the near-field light generating part lies at an end of the propagative edge.

4. The thermally-assisted magnetic recording head according to claim 3, wherein:

the plasmon generator has a V-shaped portion that includes the propagative edge and the front end face, the V-shaped portion being V-shaped in cross section parallel to the medium facing surface; and the magnetic pole includes a portion accommodated in the V-shaped portion.

5. The thermally-assisted magnetic recording head according to claim 1, wherein:

the plasmon exciting part includes a flat surface part that connects respective ends of the first and second inclined surfaces to each other, the respective ends being closer to the evanescent light generating surface; and the flat surface part includes a width changing portion, the width changing portion having a width that decreases with decreasing distance to the medium facing surface, the width being in a direction parallel to the medium facing surface and the evanescent light generating surface.

6. The thermally-assisted magnetic recording head according to claim 5, wherein:

the width changing portion has a front end part that is closer to the medium facing surface, the front end part being located at a distance from the medium facing surface; and the plasmon exciting part further has a propagative edge that connects the front end part of the width changing portion to the near-field light generating part.

7. The thermally-assisted magnetic recording head according to claim 5, wherein:

the plasmon generator has a bottom part that is shaped like a plate and two sidewall parts that are each shaped like a plate, the bottom part including the width changing portion, the two sidewall parts being located farther from the evanescent light generating surface than is the bottom part and connected to opposite ends of the bottom part in the direction parallel to the medium facing surface and the evanescent light generating surface;

the bottom part has a width that decreases with decreasing distance to the medium facing surface, the width being in the direction parallel to the medium facing surface and the evanescent light generating surface;

a distance between the two sidewall parts in the direction parallel to the medium facing surface and the evanescent light generating surface increases with increasing distance from the evanescent light generating surface, and decreases with decreasing distance to the medium facing surface;

the first and second inclined surfaces include respective surfaces of the two sidewall parts, the respective surfaces lying on opposite sides in the direction parallel to the medium facing surface and the evanescent light generating surface; and the magnetic pole includes a portion that is accommodated in a space formed by the bottom part and the two sidewall parts so as to be in contact with the bottom part and the two sidewall parts.

8. The thermally-assisted magnetic recording head according to claim 1, further comprising a buffer part that is located between the evanescent light generating surface and the plasmon exciting part and has a refractive index lower than that of the core.

9. A head gimbal assembly comprising: the thermally-assisted magnetic recording head according to claim 1; and a suspension that supports the thermally-assisted magnetic recording head.

10. A magnetic recording device comprising: a magnetic recording medium; the thermally-assisted magnetic recording head according to claim 1; and a positioning device that supports the thermally-assisted magnetic recording head and positions the thermally-assisted magnetic recording head with respect to the magnetic recording medium.

11. A method of manufacturing the thermally-assisted magnetic recording head according to claim 1, comprising the steps of:

forming the waveguide;

forming the plasmon generator after the formation of the waveguide; and forming the magnetic pole after the formation of the plasmon generator, wherein:

the step of forming the waveguide includes the steps of forming the core; and forming a clad layer that constitutes at least part of the clad;

the clad layer has a top surface that is located above the core, and a groove that opens in the top surface of the clad layer and is located above the core; and the groove has first and second sidewalls that decrease in distance from each other with increasing distance from the top surface of the clad layer, the method further comprising the step of forming a dielectric film in the groove, between the step of forming the waveguide and the step of forming the plasmon generator, the dielectric film being intended for determining a shape of the plasmon generator, wherein the groove and the dielectric film constitute an accommodating part for accommodating the plasmon generator, and the plasmon generator is formed to be accommodated in the accommodating part.

12. The method according to claim 11, wherein:

the dielectric film includes a first film portion that adheres to the first sidewall, and a second film portion that adheres to the second sidewall;

each of the first film portion and the second film portion includes an upper part and a lower part that are continuous with each other;

in the first film portion, the lower part has a thickness smaller than that of the upper part in a direction perpendicular to the first sidewall; and in the second film portion, the lower part has a thickness smaller than that of the upper part in a direction perpendicular to the second sidewall.

13. The method according to claim 12, wherein the dielectric film is formed by sputtering.

14. The method according to claim 12, wherein:

the dielectric film is formed by ion beam sputtering;

when forming the first film portion, a traveling direction of a center of a material particle flow for forming the first film portion forms a greater angle with respect to a direction perpendicular to the top surface of the clad layer than an angle that the second sidewall forms with respect to the direction perpendicular to the top surface of the clad layer; and when forming the second film portion, a traveling direction of a center of a material particle flow for forming the second film portion forms a greater angle with respect to the direction perpendicular to the top surface of the clad layer than an angle that the first sidewall forms with respect to the direction perpendicular to the top surface of the clad layer.

\* \* \* \* \*